(12) United States Patent
Matsumoto

(10) Patent No.: US 7,989,751 B2
(45) Date of Patent: Aug. 2, 2011

(54) LIGHT COMBINING METHOD, ILLUMINATION DEVICE, AND PROJECTION DISPLAY DEVICE

(75) Inventor: Shinya Matsumoto, Hirakata (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 297 days.

(21) Appl. No.: 12/476,306

(22) Filed: Jun. 2, 2009

(65) Prior Publication Data

US 2009/0303446 A1 Dec. 10, 2009

(30) Foreign Application Priority Data

Jun. 6, 2008 (JP) ................................. 2008-149943

(51) Int. Cl.
*H01L 27/00* (2006.01)
(52) U.S. Cl. ..................................... 250/208.1; 250/216
(58) Field of Classification Search .................. 250/216, 250/239, 208.1; 353/37, 33, 31, 119; 359/10, 359/629, 823, 618, 638

See application file for complete search history.

(56) References Cited

U.S. PATENT DOCUMENTS 4,978,197 A * 12/1990 Horikawa ..................... 359/629

FOREIGN PATENT DOCUMENTS

| JP | 11-103132 A | 4/1999 |
| JP | 2006-319011 A | 11/2006 |
| WO | 99/49358 A1 | 9/1999 |

* cited by examiner

*Primary Examiner* — Que T Le
(74) *Attorney, Agent, or Firm* — Marvin A. Motsenbocker; Mots Law, PLLC

(57) ABSTRACT

A first light source arrangement pattern is defined by: defining segments opposing to each other and arranged at end positions out of three segments in a first unit and three segments in a second unit, as light source arrangement positions; and defining one of three segments in a third unit, at the same position as the segment defined as the light source arrangement position in the first unit, as a light source arrangement position. A second light source pattern is defined by defining segments out of the segments in the first unit, the second unit, and the third unit, at end positions opposite to the segments defined as the light source arrangement positions in the first light source arrangement pattern, as light source arrangement positions. The first light source arrangement pattern and the second light source arrangement pattern are alternately arranged in the vertical direction.

6 Claims, 17 Drawing Sheets

U: UPPER
L: LOWER

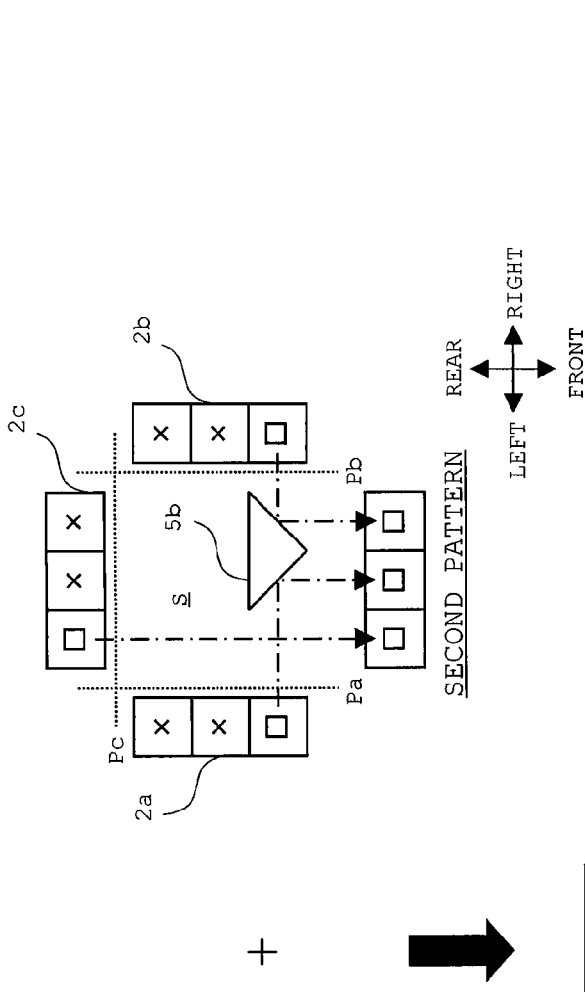
*FIG. 1B*
*FIG. 1A*
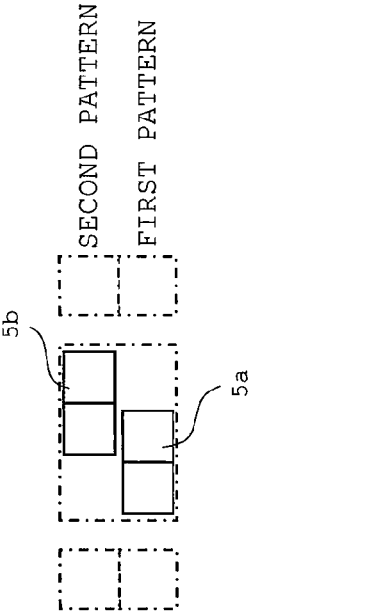
*FIG. 1D*
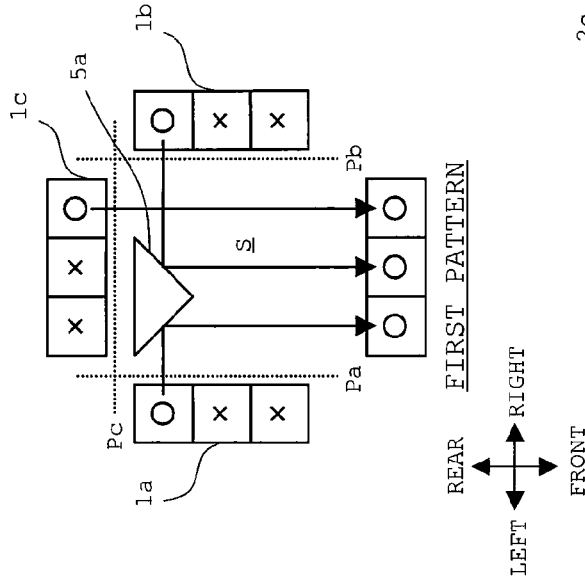
*FIG. 1C*

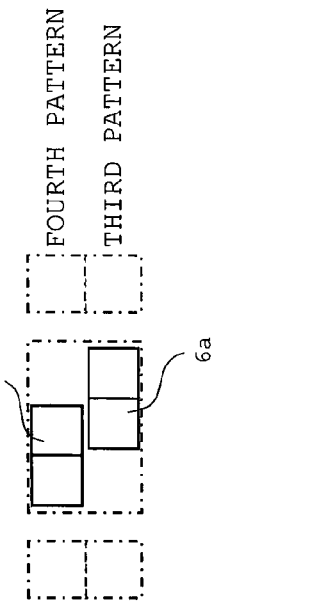
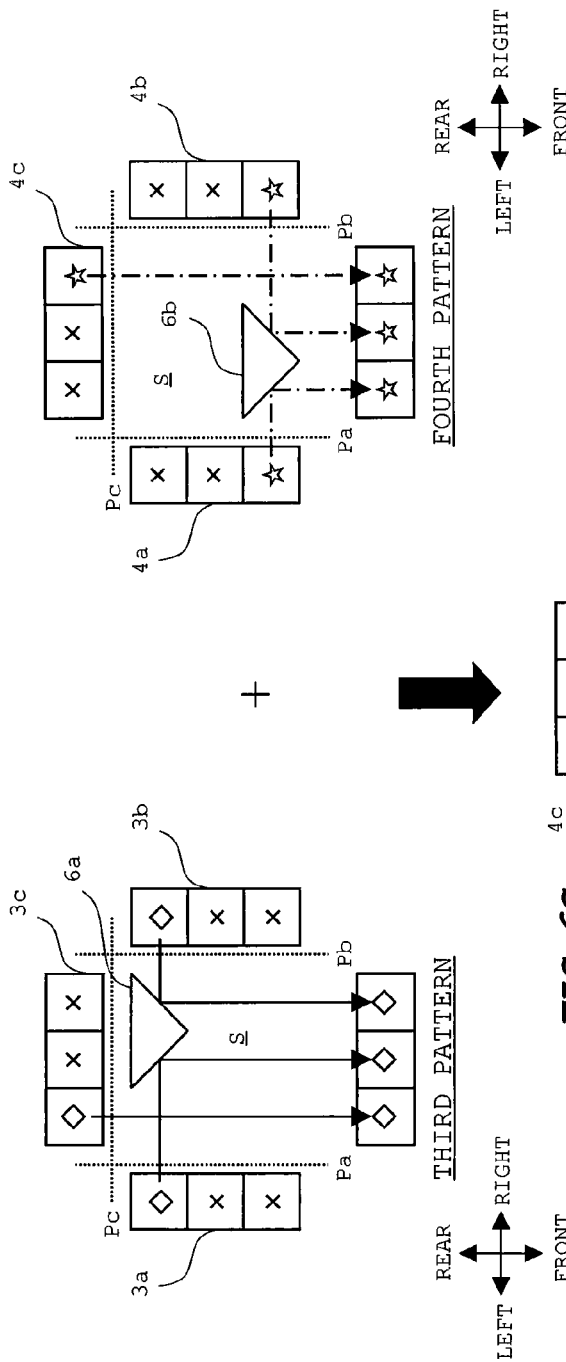
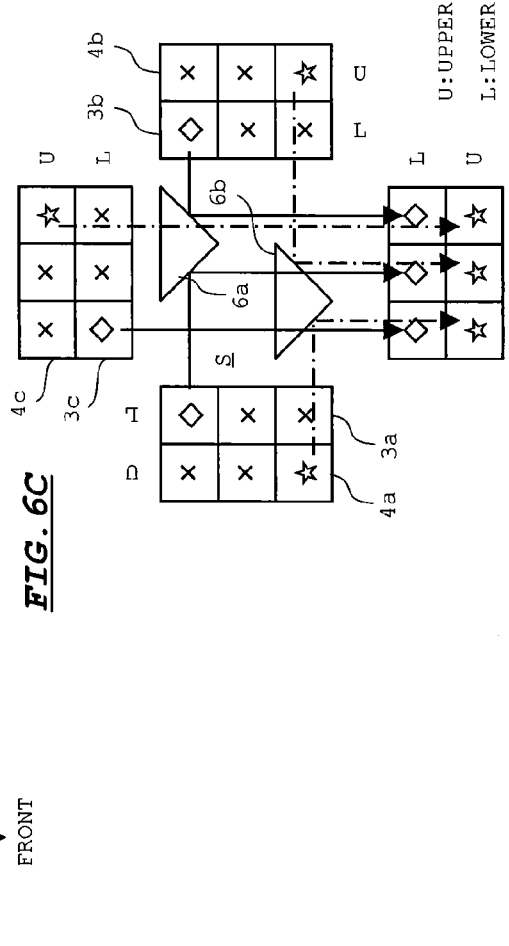
FIG. 6A — THIRD PATTERN
FIG. 6B — FOURTH PATTERN
FIG. 6C
FIG. 6D
U: UPPER
L: LOWER

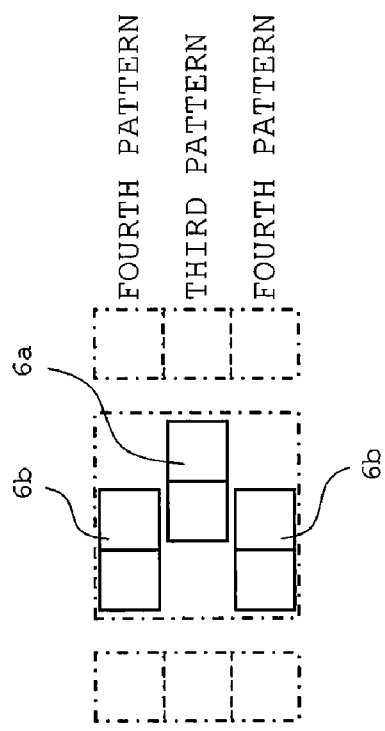
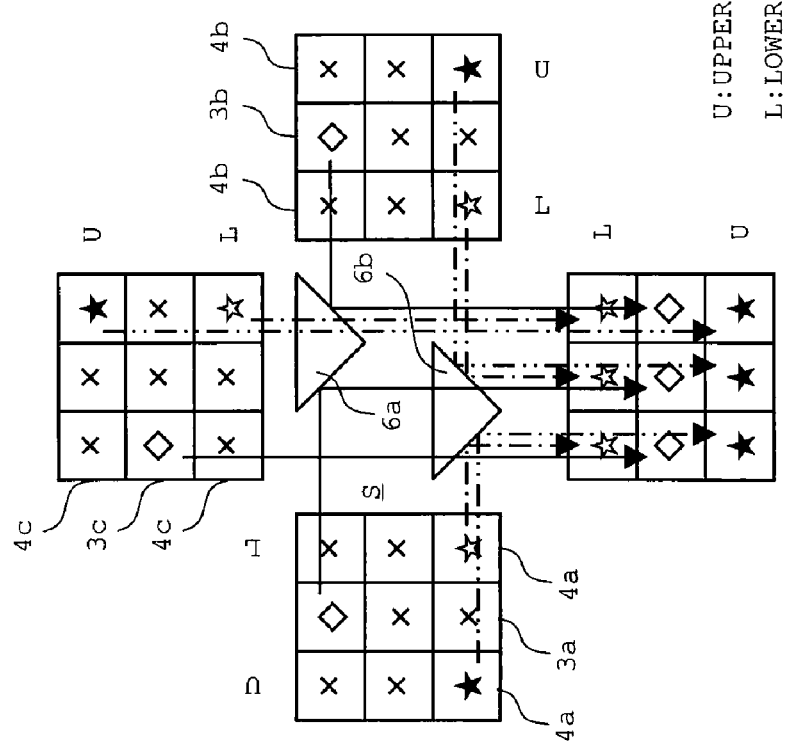
FIG. 8A
FIG. 8B

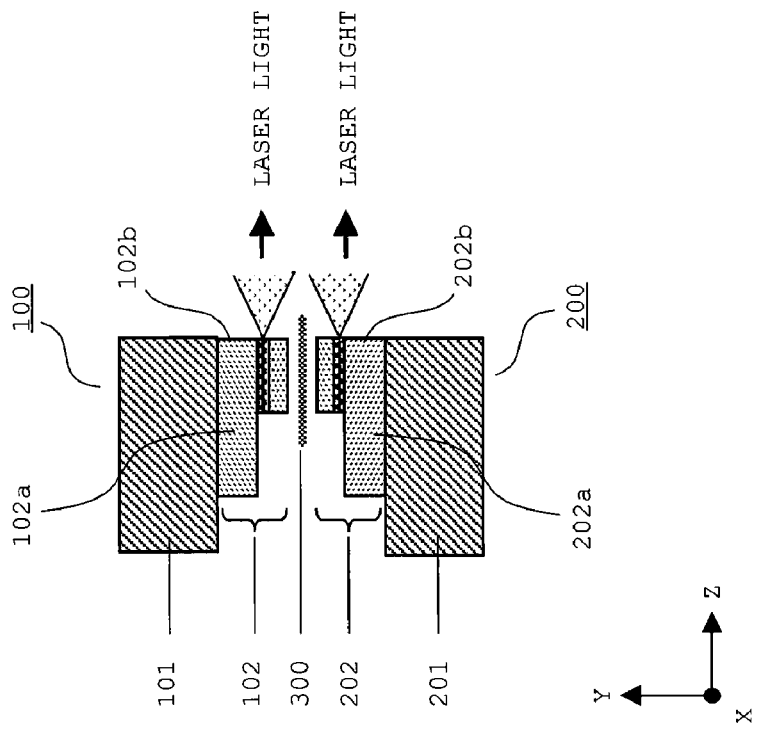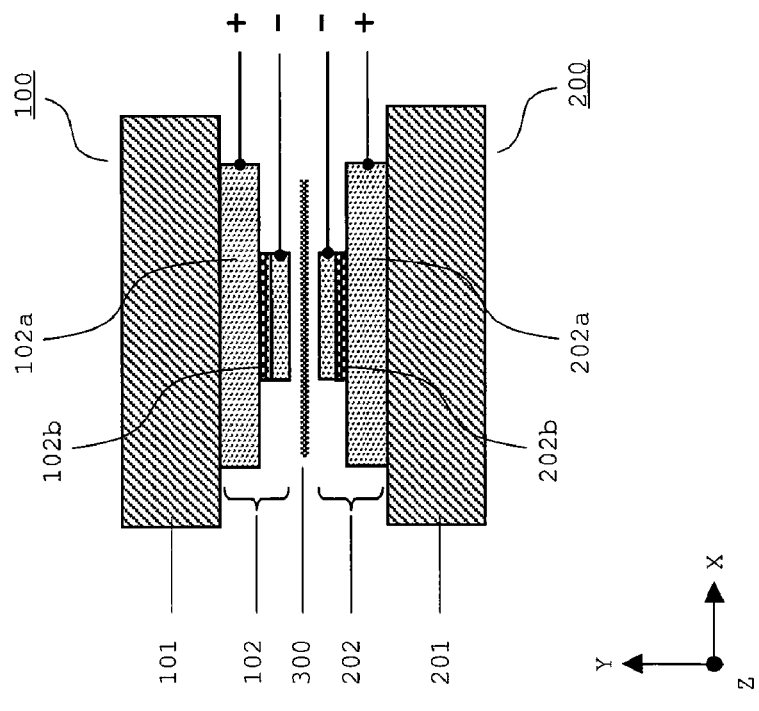

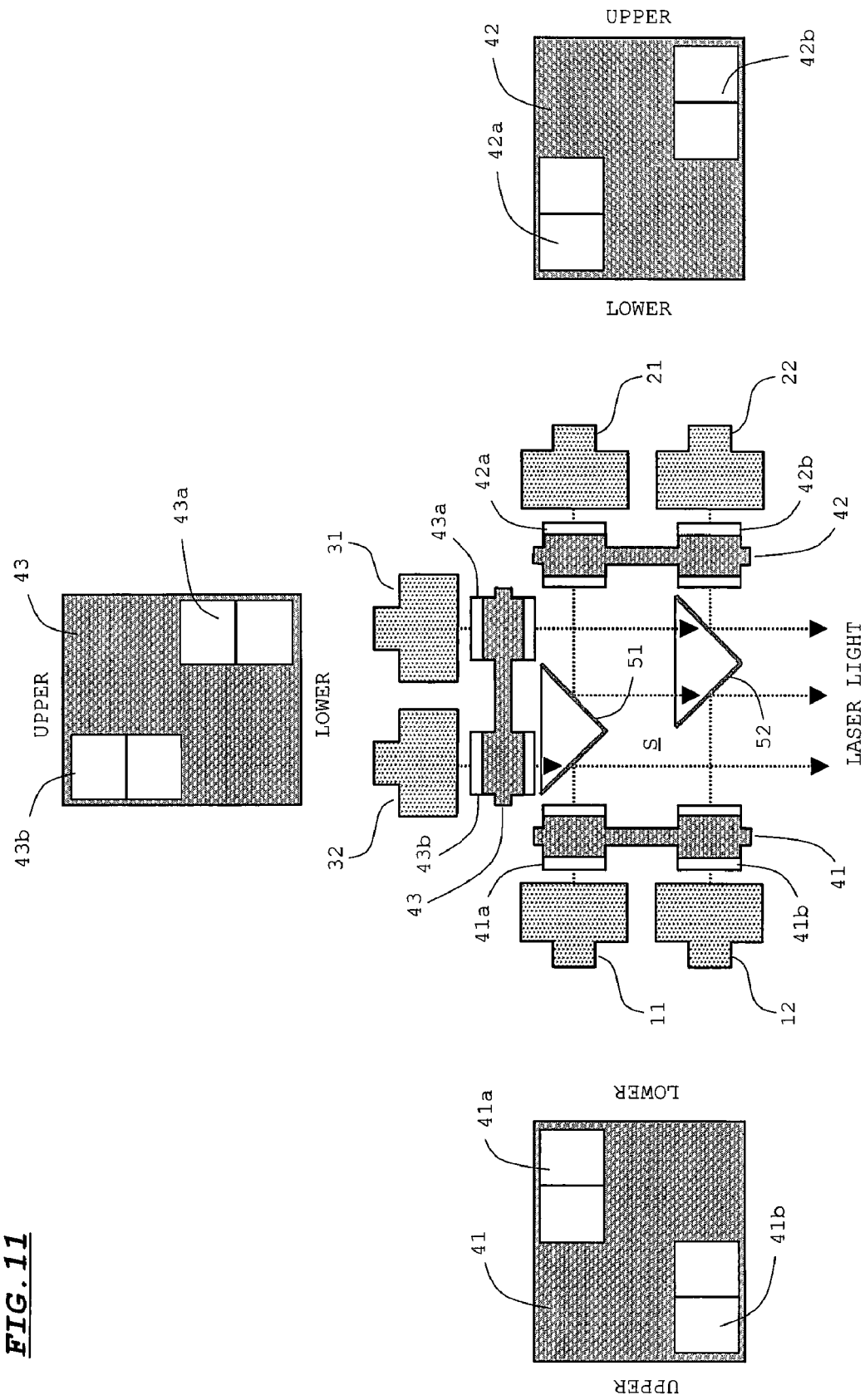

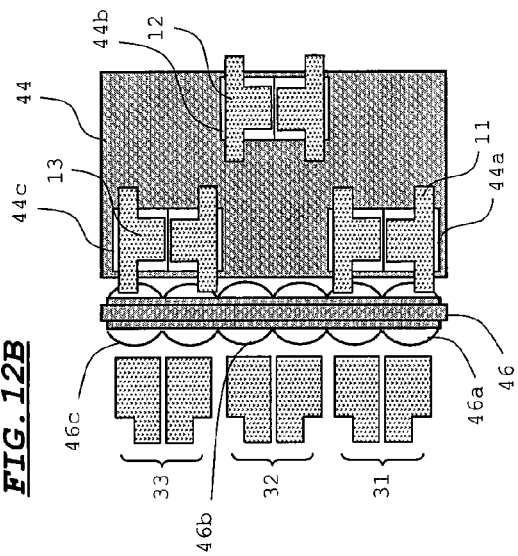
FIG.12A
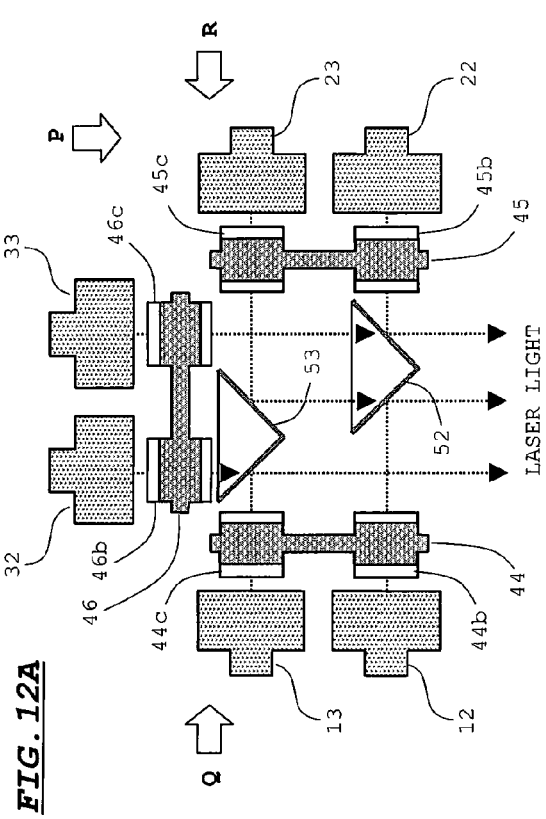
FIG.12B
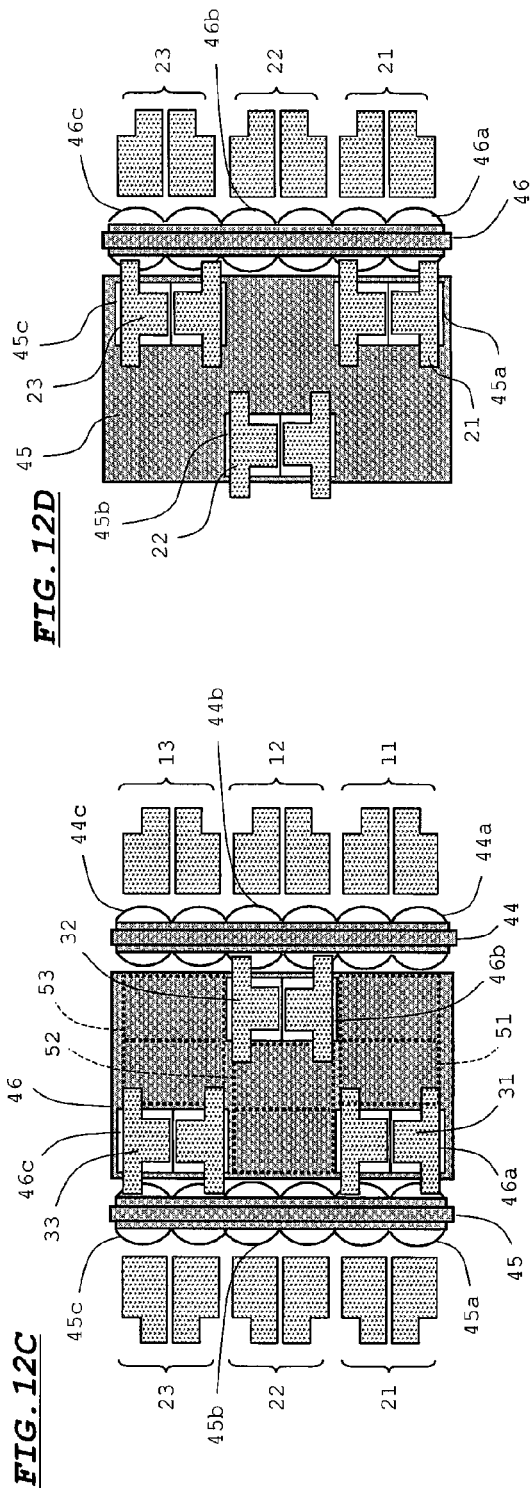
FIG.12C
FIG.12D

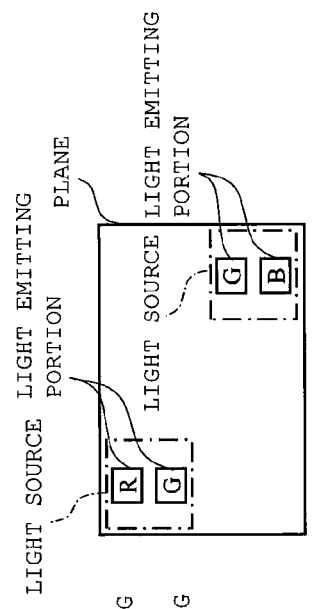
FIG. 16A
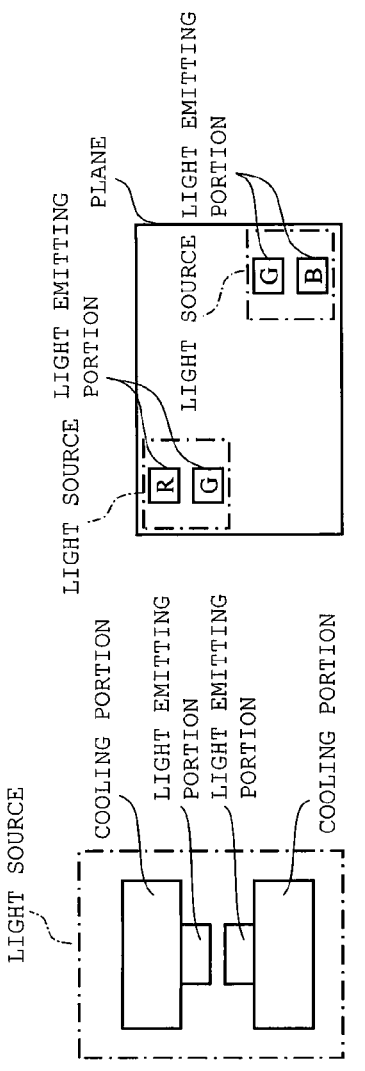
FIG. 16C
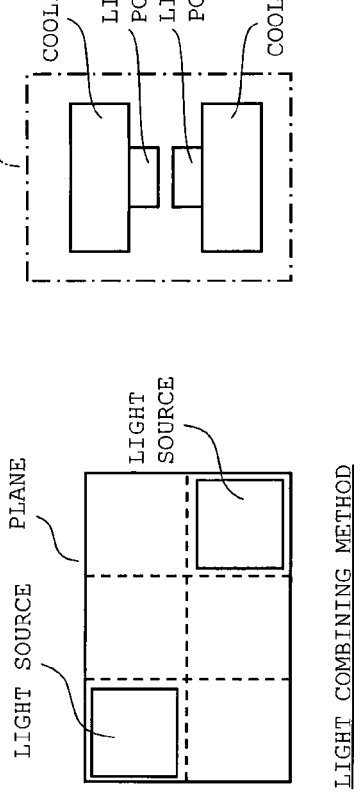
FIG. 16B
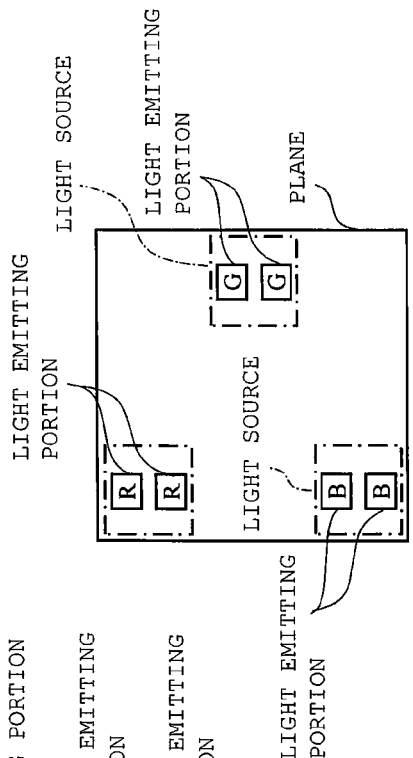
FIG. 16E
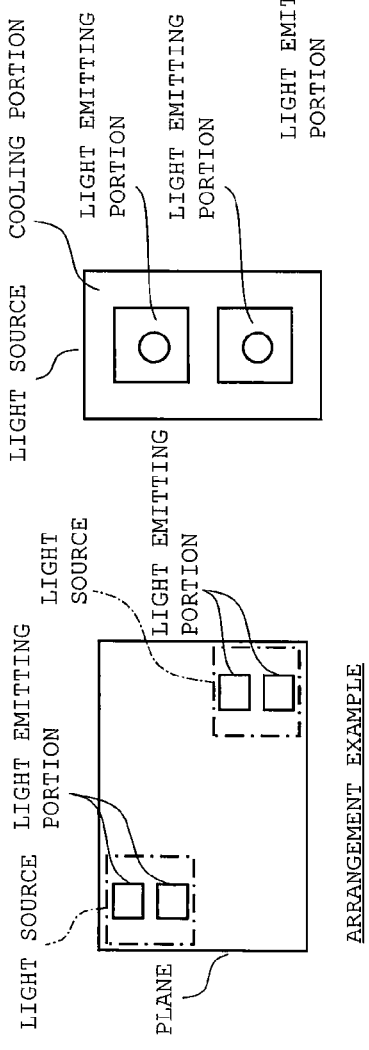
FIG. 16D
FIG. 16F

LIGHT COMBINING METHOD, ILLUMINATION DEVICE, AND PROJECTION DISPLAY DEVICE

This application claims priority under 35 U.S.C. Section 119 of Japanese Patent Application No. 2008-149943 filed Jun. 6, 2008, entitled "LIGHT COMBINING METHOD, ILLUMINATION DEVICE, AND PROJECTION DISPLAY DEVICE". The disclosers of the above applications are incorporated herein by reference.

BACKGROUND OF THE INVENTION

1. Field of the Invention

The present invention relates to a light combining method for combining light from multiple light sources, an illumination device, and a projection display device incorporated with the illumination device.

2. Description of the Related Art

Heretofore, there has been known a projection display device (hereinafter, called as a "projector") for modulating light from a light source based on an image signal to project modulated image light onto a projection plane.

High luminance has been required in the projector, as large-sized screens have been produced in recent years. High luminance has also been required in an illumination device to be loaded in the projector.

In the illumination device, an arrangement of combining light emitted from multitudes of light sources by using a mirror or a like device may be employed. The above arrangement is advantageous in enhancing light integration, and producing an illumination device with high luminance.

For instance, multiple light sources are arranged on each of a first plane and a second plane opposing to each other, and a third plane orthogonal to the first plane and the second plane. A mirror corresponding to the light sources arranged on the first plane and the second plane is provided, in a space defined by the first through the third planes, at such a position that light from the light sources arranged on the third plane may not be interrupted. Light from the light sources arranged on the first plane and the second plane is respectively reflected on the mirror in the same direction as the propagating direction of light from the light sources arranged on the third plane. In this way, illumination light obtained by combining the light in three directions is emitted from the illumination device.

In recent years, an LED light source or a laser light source is used as a light source to be provided in the illumination device. The laser light source is superior in rendering a wide color space with high luminance and high precision. With use of the laser light source, production of an illumination device with higher luminance can be expected.

However, the total heat generation amount of a laser light source is large, as compared with a lamp, and a temperature-dependent output change is likely to occur. In view of this, various methods for cooling a laser light source may be proposed. For instance, a laser light source may be cooled by using a heat sink (heat releasing fin), a Peltier element, or a liquid cooling system.

In the case where an edge emitter semiconductor laser is used as a laser light source, the solid angle of emission beams is considerably large. Accordingly, it is necessary to collimate laser light into parallel light, according to needs, by a lens such as a cylindrical lens in order to smoothly guide the laser light to an optical system (such as a fly-eye lens) provided posterior to the lens. In this case, the lenses to be arranged on each of the first plane, the second plane, and the third plane may be integrally formed into an optical element. The optical element (hereinafter, called as "lens array element") constituted of the multiple lenses is arranged on each of the first plane, the second plane, and the third plane.

In the case where a cooling portion is mounted on each of light sources, as described above, the size of each of the light sources may be increased, and the light sources are likely to interfere with each other. Accordingly, it is difficult to arrange each two of the light sources close to each other on each of the planes. Also, in the case where a lens such as a cylindrical lens is used, if the lens arrangement is different among the planes, it is necessary to prepare different lens array elements for these planes, which may increase the cost.

However, it is not easy to provide a light source arrangement, wherein each two of the light sources are not arranged close to each other, and identical lens array elements are used for the three planes. In the case where light integration is increased, and the number of light sources to be arranged on each of the planes is increased, it becomes increasingly difficult to obtain the above light source arrangement.

SUMMARY OF THE INVENTION

An object of the present invention is to provide a light combining method, an illumination device, and a projection display device that enable to arrange light sources in intended positions at a reduced cost.

A first aspect of the present invention is directed to a light combining method for combining light to be emitted from a first plane, a second plane opposing to the first plane, and a third plane connecting the first plane and the second plane in a transverse direction by a mirror portion.

In the light combining method according to the first aspect, a first unit constituted of three segments in a horizontal direction and one segment in a vertical direction, and a second unit having the same arrangement as the first unit are arranged on the first plane and the second plane, respectively, in such a manner that the segments in the first unit and the segments in the second unit oppose to each other, and a third unit having the same arrangement as the first unit is arranged on the third plane on the same level as the first unit and the second unit to define a first light source arrangement pattern and a second light source arrangement pattern.

The first light source arrangement pattern is defined by: defining segments opposing to each other and arranged at end positions out of the three segments in the first unit and the three segments in the second unit, as light source arrangement positions; and defining one of the three segments in the third unit, at the same position as the segment defined as the light source arrangement position in the first unit, as a light source arrangement position.

The second light source arrangement pattern is defined by: defining segments out of the segments in the first unit, the second unit, and the third unit, at end positions opposite to the segments defined as the light source arrangement positions in the first light source arrangement pattern, as light source arrangement positions.

Then, the first light source arrangement pattern and the second light source arrangement pattern are alternately arranged in the vertical direction.

Then, the mirror portion for reflecting light from light sources arranged at the light source arrangement positions on the first plane and the second plane in the same direction as light from light sources arranged at the light source arrangement positions on the third plane to combine the light from the light sources is arranged in an area surrounded by the first plane, the second plane, and the third plane.

As described above, it is not easy to simultaneously solve the tasks on the light source arrangement, and use of identical lens array elements. The inventor of the present application found, as a result of trial and error, the light combining method according to the first aspect.

In the light combining method according to the first aspect, the first light source arrangement pattern and the second light source arrangement pattern are alternately arranged in the vertical direction. This eliminates a likelihood that light sources may be arranged in segments adjacent to each other vertically, horizontally, or obliquely on each of the three planes.

Also, since the light source arrangement positions are identical to each other between the first plane and the third plane, in the case where lenses are arranged at emission positions of the light sources, respectively, the lens arrangement positions are identical to each other between the first plane and the third plane. Accordingly, in the case where a lens array element is produced by integrally forming the lenses, identical lens array elements can be used between the first plane and the third plane. Further, since the light source arrangement positions on the first plane, and the light source arrangement positions on the second plane have a mirror image relation to each other, the lens array element for the first plane can be used as the lens array element for the second plane by horizontally inverting the lens array element for the first plane. Accordingly, identical lens array elements can be used with respect to all the three planes.

A second aspect of the present invention is directed to an illumination device for combining light to be emitted from a first plane, a second plane opposing to the first plane, and a third plane connecting the first plane and the second plane in a transverse direction to generate illumination light.

The illumination device according to the second aspect includes a first light source unit arranged at such a position as to emit the light from the first plane, a second light source unit arranged at such a position as to emit the light from the second plane, a third light source unit arranged at such a position as to emit the light from the third plane, and a mirror unit for reflecting the light from the first light source unit and the light from the second light source unit in the same direction as the light from the third light source unit.

In the above arrangement, a first unit constituted of three segments in a horizontal direction and one segment in a vertical direction, and a second unit having the same arrangement as the first unit are arranged on the first plane and the second plane, respectively, in such a manner that the segments in the first unit and the segments in the second unit oppose to each other, and a third unit having the same arrangement as the first unit is arranged on the third plane on the same level as the first unit and the second unit to define a first light source arrangement pattern and a second light source arrangement pattern.

The first light source arrangement pattern is defined by: defining segments opposing to each other and arranged at end positions out of the three segments in the first unit and the three segments in the second unit, as light source arrangement positions; and defining one of the three segments in the third unit, at the same position as the segment defined as the light source arrangement position in the first unit, as a light source arrangement position.

The second light source arrangement pattern is defined by: defining segments out of the segments in the first unit, the second unit, and the third unit, at end positions opposite to the segments defined as the light source arrangement positions in the first light source arrangement pattern, as light source arrangement positions.

The first light source unit, the second light source unit, and the third light source unit are constructed by arranging light sources at the light source arrangement positions defined by alternately arranging the first light source arrangement pattern and the second light source arrangement pattern in the vertical direction, and the mirror unit is constructed by arranging mirrors constituting the mirror unit at such positions that the light from the light sources arranged at the light source arrangement positions on the first plane and the second plane is reflected in the same direction as the light from the light sources arranged at the light source arrangement positions on the third plane to combine the light from the light sources.

Similarly to the light combining method according to the first aspect, in the illumination device according to the second aspect, there is no likelihood that light sources may be arranged in segments adjacent to each other vertically, horizontally, or obliquely on each of the three planes. Also, the above arrangement enables to use identical lens array elements with respect to all the three planes, in the case where lenses are arranged at emission positions of the light sources, respectively.

A third aspect of the present invention is directed to a projection display device. The projection display device according to the third aspect includes: an illumination device for combining light to be emitted from a first plane, a second plane opposing to the first plane, and a third plane connecting the first plane and the second plane in a transverse direction to generate illumination light; a modulating portion for modulating the illumination light to be emitted from the illumination device; and a projecting portion for projecting the light modulated by the modulating portion onto a projection plane.

In the above arrangement, the illumination device includes: a first light source unit arranged at such a position as to emit the light from the first plane; a second light source unit arranged at such a position as to emit the light from the second plane; a third light source unit arranged at such a position as to emit the light from the third plane; and a mirror unit for reflecting the light from the first light source unit and the light from the second light source unit in the same direction as the light from the third light source unit.

Further, a first unit constituted of three segments in a horizontal direction and one segment in a vertical direction, and a second unit having the same arrangement as the first unit are arranged on the first plane and the second plane, respectively, in such a manner that the segments in the first unit and the segments in the second unit oppose to each other, and a third unit having the same arrangement as the first unit is arranged on the third plane on the same level as the first unit and the second unit to define a first light source arrangement pattern and a second light source arrangement pattern.

The first light source arrangement pattern is defined by: defining segments opposing to each other and arranged at end positions out of the three segments in the first unit and the three segments in the second unit, as light source arrangement positions; and defining one of the three segments in the third unit, at the same position as the segment defined as the light source arrangement position in the first unit, as a light source arrangement position.

The second light source pattern is defined by: defining segments out of the segments in the first unit, the second unit, and the third unit, at end positions opposite to the segments defined as the light source arrangement positions in the first light source arrangement pattern, as light source arrangement positions.

The first light source unit, the second light source unit, and the third light source unit are constructed by arranging light sources at the light source arrangement positions defined by alternately arranging the first light source arrangement pattern and the second light source arrangement pattern in the vertical direction, and the mirror unit is constructed by arranging mirrors constituting the mirror unit at such positions that the light from the light sources arranged at the light source arrangement positions on the first plane and the second plane is reflected in the same direction as the light from the light sources arranged at the light source arrangement positions on the third plane to combine the light from the light sources.

Similarly to the illumination device according to the second aspect, in the projection display device according to the third aspect, there is no likelihood that light sources may be arranged in segments adjacent to each other vertically, horizontally, or obliquely on each of the three planes. Also, the above arrangement enables to use identical lens array elements with respect to all the three planes, in the case where lenses are arranged at emission positions of the light sources, respectively.

BRIEF DESCRIPTION OF THE DRAWINGS

These and other objects, and novel features of the present invention will become more apparent upon reading the following detailed description along with the accompanying drawings.

FIGS. 1A, 1B, 1C, and 1D are diagrams for describing a first arrangement example of a light combining method embodying the present invention.

FIGS. 6A, 6B, 6C, and 6D are diagrams for describing a sixth arrangement example of the light combining method.

FIGS. 8A and 8B are diagrams for describing an eighth arrangement example of the light combining method.

FIGS. 10A and 10B are diagrams showing arrangement of a light source module in the first construction example.

FIG. 11 is a diagram for describing how lens plates in the first construction example of the illumination device are used in common.

FIGS. 12A, 12B, 12C, and 12D are diagrams showing a second construction example of the illumination device embodying the present invention.

FIGS. 16A through 16F are diagrams for describing light sources to be used in the present invention.

Figure 2B:
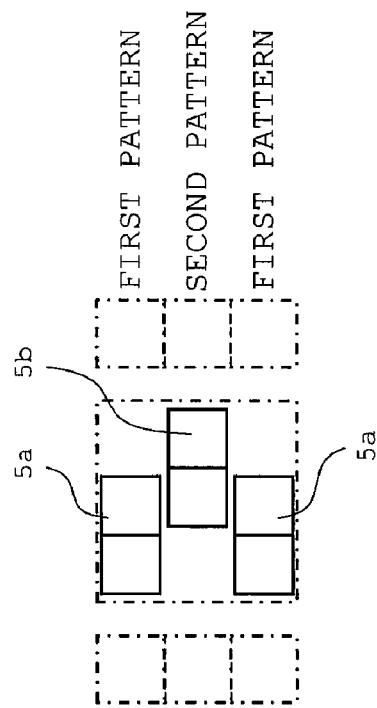
FIGS. 2A and 2B are diagrams for describing a second arrangement example of the light combining method.

The drawings are provided mainly for describing the present invention, and do not limit the scope of the present invention.

DESCRIPTION OF THE PREFERRED EMBODIMENTS

In the following, an embodiment of the present invention is described referring to the drawings.

Light Combining Method

First, first through eighth arrangement examples of a light combining method embodying the present invention are described referring to FIGS. 1A through 8B.

FIGS. 1A, 1B, 1C, and 1D are diagrams for describing the first arrangement example of the light combining method embodying the present invention. FIG. 1A is a plan view showing a first pattern, and FIG. 1B is a plan view showing a second pattern. FIG. 1C is a plan view showing a light combining pattern, wherein the first pattern and a second pattern are arranged in two rows in the vertical direction. FIG. 1D is a front view showing an arrangement of prism mirrors in the light combining pattern shown in FIG. 1C.

The light source arrangement pattern as the first pattern corresponds to a first light source arrangement pattern of the claimed invention, and the light source arrangement pattern as the second pattern corresponds to a second light source arrangement pattern of the claimed invention.

In the light combining method, the first pattern shown in FIG. 1A is used as the first light source arrangement pattern, and the second pattern shown in FIG. 1B is used as the second light source arrangement pattern.

Referring to FIG. 1A, in the first pattern, a left unit 1a, a right unit 1b, and a rear unit 1c, each of which is constituted of three rectangular segments arranged in the horizontal direction and one rectangular segment arranged in the vertical direction, are respectively provided on a left plane Pa, a right plane Pb, and a rear plane Pc surrounding a light combining area "S". The left plane Pa and the right plane Pb are substantially aligned in parallel to each other. The rear plane Pc is connected to the left plane Pa and the right plane Pb in a transverse direction, and intersects substantially perpendicularly to the left plane Pa and the right plane Pb. The segments in the left unit 1a and the segments in the right unit 1b oppose to each other. The segments in the units are each illustrated in parallel to the plane of FIG. 1A for simplifying the description; however, actually, the segments stand upright with respect to the plane of FIG. 1A.

The rearmost segment in the left unit 1a is defined as a light source arrangement position, and the segment in the right unit 1b opposing to the rearmost segment in the left unit 1a i.e. the rearmost segment in the right unit 1b is also defined as a light source arrangement position. Further, one of the three segments in the rear unit 1c at a position corresponding to the light source arrangement position in the left unit 1a i.e. the rightmost segment in the rear unit 1c is also defined as a light source arrangement position. In FIG. 1A, the segments which are defined as the light source arrangement positions are marked with the symbol "○", and the segments which are not defined as the light source arrangement positions are marked with the symbol "×".

Light sources are arranged at the light source arrangement positions on the three planes Pa, Pb, and Pc. A prism mirror 5a is arranged in the light combining area "S". The prism mirror 5a is arranged at a rear left position in the light combining area "S", in other words, a position where light from the light sources on the left plane Pa and the right plane Pb is reflected in the same direction as light from the light source on the rear plane Pc, and where an optical path of light from the rear plane Pc is not obstructed.

Thus, light from the light sources arranged on the three planes Pa, Pb, and Pc is combined through the prism mirror 5a arranged in the light combining area "S". Thereby, light from the three light sources is emitted in parallel to each other in the forward direction from the light combining area "S". Imaginary irradiation positions of light emitted from the corresponding light sources are indicated on a front portion of the light combining area "S" by segments marked with the same symbol i.e. the symbol (○) as the light source arrangement positions.

Referring to FIG. 1B, similarly to the first pattern, a left unit 2a, a right unit 2b, and a rear unit 2c are provided in the second pattern. Segments at end positions opposite to the segments defined as the light source arrangement positions in the first pattern, in other words, the frontmost segment of the left unit 2a, the frontmost segment of the right unit 2b, and the leftmost segment of the rear unit 2c are defined as light source arrangement positions. In FIG. 1B, the segments which are defined as the light source arrangement positions are marked with the symbol "□", and the segments which are not defined as the light source arrangement positions are marked with the symbol "×".

Similarly to the first pattern, light sources are arranged at the light source arrangement positions, and a prism mirror 5b is arranged, in the light combining area "S", at a position (front right position in the light combining area "S"), where an optical path of light from the light source on the rear plane Pc is not obstructed, and where light from the light sources on the left plane Pa and the right plane Pb is reflected. Thus, light from the light sources arranged on the three planes Pa, Pb, and Pc is combined through the prism mirror 5b arranged in the light combining area "S". Thereby, light from the three light sources is emitted in parallel to each other in the forward direction from the light combining area "S". Imaginary irradiation positions of light emitted from the corresponding light sources are indicated on a front portion of the light combining area "S" by segments marked with the same symbol i.e. the symbol (□) as the light source arrangement positions.

The first pattern and the second pattern serve as a basic pattern in the inventive light combining method. In this arrangement example, as shown in FIGS. 1C and 1D, the first pattern and the second pattern are arranged in two rows in the vertical direction in a state that the first pattern is arranged in a lower row, and the second pattern is arranged in an upper row. Thereby, illumination light from six light sources integrated in such a manner that three light sources are arranged in the horizontal direction and two light sources are arranged in the vertical direction can be obtained.

Figure 2A:
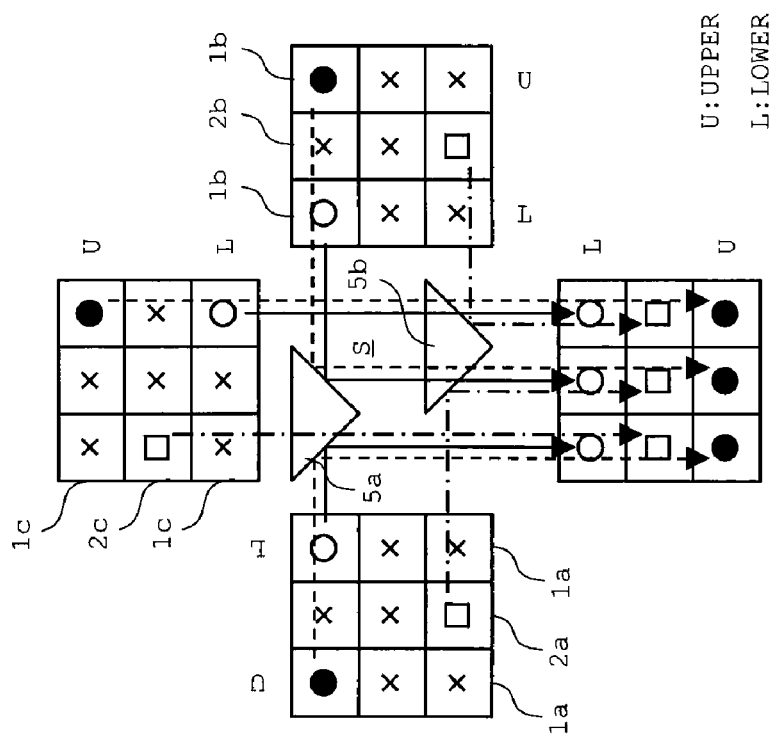

FIGS. 2A and 2B are diagrams for describing the second arrangement example of the light combining method. FIG. 2A is a plan view showing a light combining pattern, wherein the first pattern and the second pattern are alternately arranged in three rows in the vertical direction, and FIG. 2B is a front view showing an arrangement of prism mirrors in the light combining pattern shown in FIG. 2A.

In this arrangement example, the first pattern and the second pattern are alternately arranged in three rows in the vertical direction. Thereby, illumination light from nine light sources integrated in such a manner that three light sources are arranged in the horizontal direction and three light sources are arranged in the vertical direction can be obtained. Referring to FIG. 2A, segments defined as light source arrangement positions in the units in the third row from the lowermost row are marked with the symbol "●" for simplifying the description. Imaginary irradiation positions of light emitted from the corresponding light sources are indicated on a front portion of the light combining area "S" by segments marked with the corresponding same symbols as the light source arrangement positions.

Figure 3B:
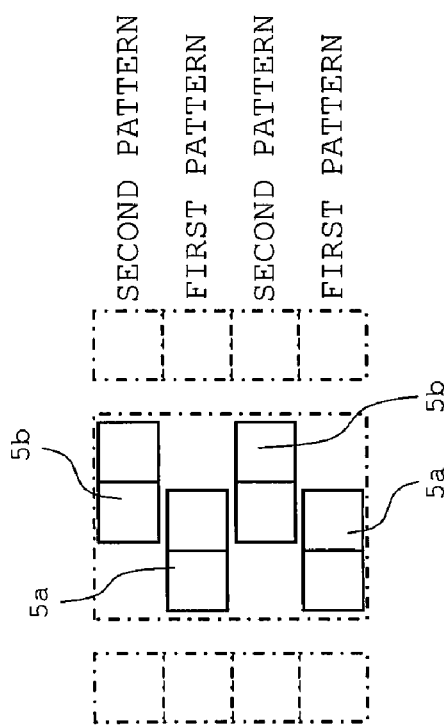
FIGS. 3A and 3B are diagrams for describing a third arrangement example of the light combining method.
Figure 3A:
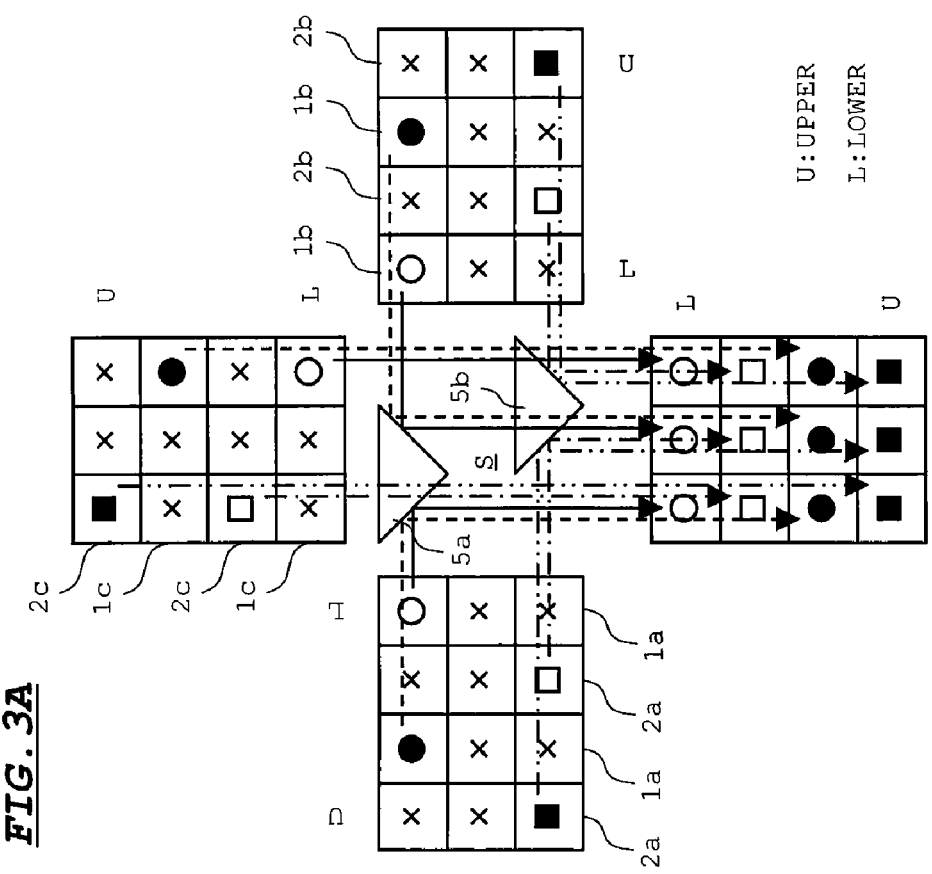

FIGS. 3A and 3B are diagrams for describing the third arrangement example of the light combining method. FIG. 3A is a plan view showing a light combining pattern, wherein the first pattern and the second pattern are alternately arranged in four rows in the vertical direction, and FIG. 3B is a front view showing an arrangement of prism mirrors in the light combining pattern shown in FIG. 3A.

In this arrangement example, the first pattern and the second pattern are alternately arranged in four rows in the vertical direction. Thereby, illumination light from twelve light sources integrated in such a manner that three light sources are arranged in the horizontal direction and four light sources are arranged in the vertical direction can be obtained. Referring to FIG. 3A, segments defined as light source arrangement positions in the units in the third row and the fourth row from the lowermost row are marked with the symbol "●" and the symbol "■", respectively, for simplifying the description. Imaginary irradiation positions of light emitted from the corresponding light sources are indicated on a front portion of the light combining area "S" by segments marked with the corresponding same symbols as the light source arrangement positions.

In any of the first through the third arrangement examples, the light sources are discretely arranged, without a likelihood that each two of the light sources may be arranged in segments adjacent to each other vertically, horizontally, or obliquely. In this arrangement, even in the case where the size of each of the light sources is increased by mounting a cooling portion on the corresponding light source, the light sources are less likely to interfere with each other. In this arrangement, even if the size of each of the light sources is increased, the light sources can be arranged in intended positions on each of the planes, while suppressing an increase in the size of the illumination device.

Further, since the light source arrangement positions are identical to each other between the left plane Pa and the rear plane Pc, the positions of lenses to be arranged at respective emission positions of the light sources are also identical to each other between the left plane Pa and the rear plane Pc. Accordingly, in the case where a lens array element is integrally formed of lenses on each of the planes, identical optical elements can be used between the left plane Pa and the right plane Pc. Further, since the light source arrangement positions on the left plane Pa and the light source arrangement positions on the right plane Pb have a mirror image relation to each other, horizontally inverting the lens array element for the left plane Pa enables to use the lens array element for the left plane Pa as the lens array element for the right plane Pb. In this way, since identical lens array elements can be used with respect to all the three planes, the production cost can be reduced.

Figure 4B:
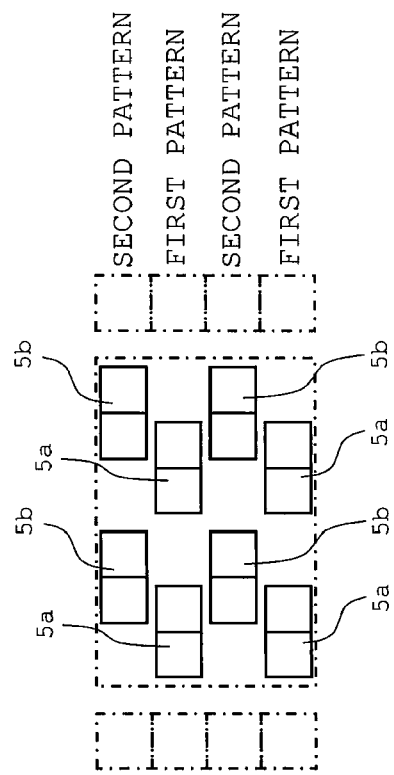
FIGS. 4A and 4B are diagrams for describing a fourth arrangement example of the light combining method.
Figure 4A:
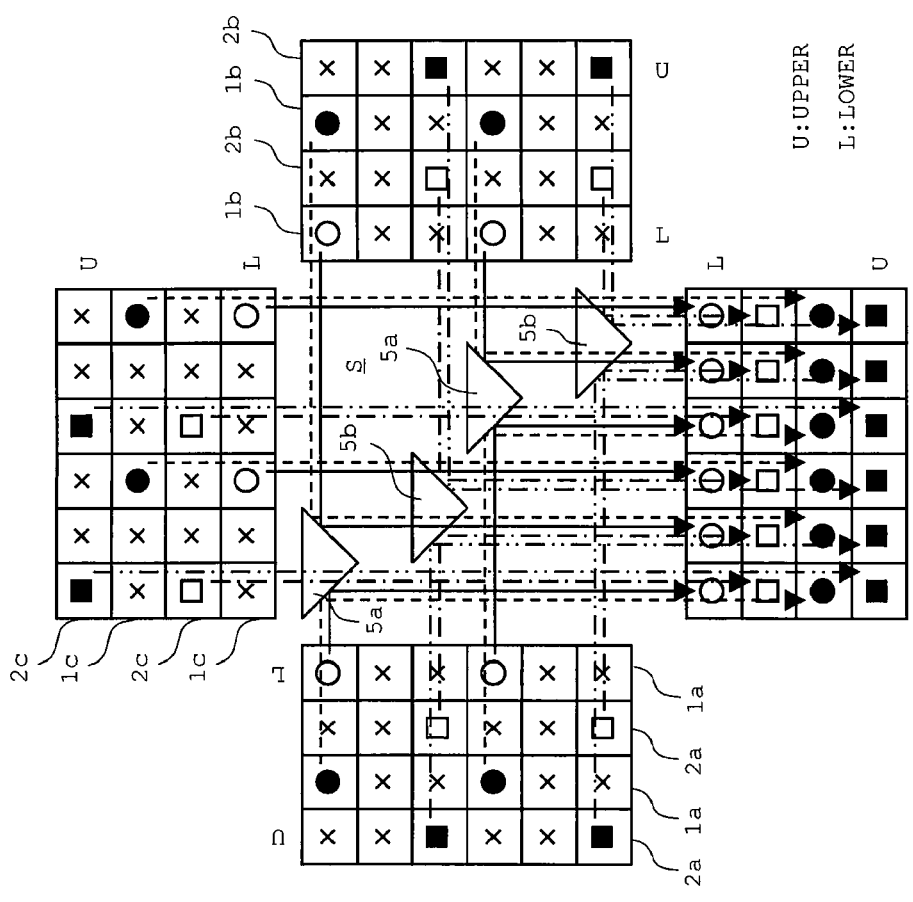

FIGS. 4A and 4B are diagrams for describing the fourth arrangement example of the light combining method. FIG. 4A is a plan view showing a light combining pattern, wherein the first pattern and the second pattern are alternately arranged in four rows in the vertical direction, and the four-row arrangement is arranged in two columns in the horizontal direction, and FIG. 4B is a front view showing an arrangement of prism mirrors in the light combining pattern shown in FIG. 4A.

In this arrangement example, the four-row arrangement constructed by alternately arranging the first pattern and the second pattern in four rows in the vertical direction is arranged in two columns in the horizontal direction. In this way, the light combining pattern may be configured by arranging a multi-row arrangement in multiple columns in the horizontal direction, in place of alternately arranging the first pattern and the second pattern in multiple rows solely in the vertical direction. Thereby, higher luminance can be obtained. Further, the light sources are discretely arranged, without a likelihood that each two of the light sources may be arranged in segments adjacent to each other horizontally or vertically. In this arrangement, even in the case where a cooling portion is mounted on each of the light sources, the light sources are less likely to interfere with each other. Further, similarly to the first through the third arrangement examples, identical lens array elements can be used with respect to all the three planes.

Figure 5B:
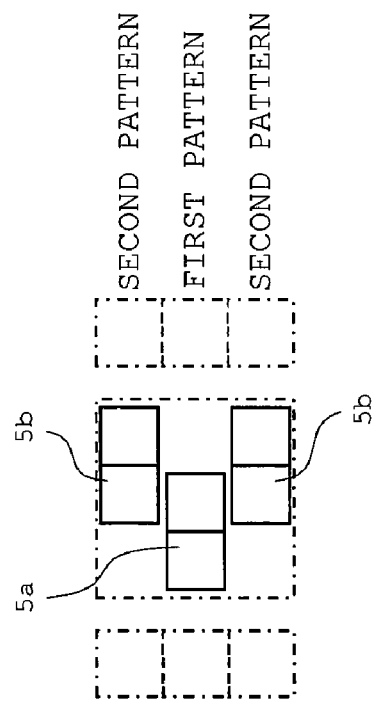
FIGS. 5A and 5B are diagrams for describing a fifth arrangement example of the light combining method.
Figure 5A:
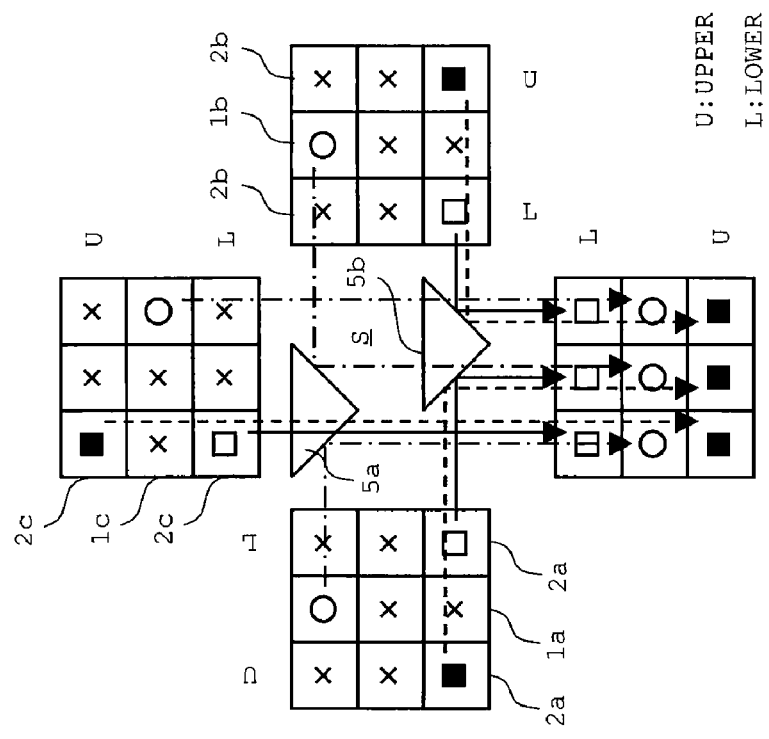

FIGS. 5A and 5B are diagrams for describing the fifth arrangement example of the light combining method. FIG. 5A is a plan view showing a light combining pattern, wherein the second pattern and the first pattern are alternately arranged in three rows in the vertical direction, with the second pattern being arranged in the lowermost row. FIG. 5B is a front view showing an arrangement of prism mirrors in the light combining pattern shown in FIG. 5A.

In the first through the fourth arrangement examples, the first pattern and the second pattern are alternately arranged, with the first pattern being arranged in the lowermost row. However, as described in the fifth arrangement example, the second pattern and the first pattern may be alternately arranged, with the second pattern being arranged in the lowermost row. In the fifth arrangement example, the second pattern and the first pattern are alternately arranged in three rows in the vertical direction. Thereby, illumination light from nine light sources integrated in such a manner that three light sources are arranged in the horizontal direction and three light sources are arranged in the vertical direction can be obtained. This arrangement also enables to suppress interference between the light sources, and use identical lens array elements.

FIGS. 6A, 6B, 6C, and 6D are diagrams for describing the sixth arrangement example of the light combining method. FIG. 6A is a plan view showing a third pattern, and FIG. 6B is a plan view showing a fourth pattern. FIG. 6C is a plan view showing a light combining pattern, wherein the third pattern and the fourth pattern are arranged in two rows in the vertical direction, and FIG. 6D is a front view showing an arrangement of prism mirrors in the light combining pattern shown in FIG. 6C.

The light source arrangement pattern as the third pattern corresponds to the first light source arrangement pattern of the claimed invention, and the light source arrangement pattern as the fourth pattern corresponds to the second light source arrangement pattern of the claimed invention.

In FIG. 6A, segments which are defined as light source arrangement positions are marked with the symbol "◊", and segments which are not defined as light source arrangement positions are marked with the symbol "×". In FIG. 6B, segments which are defined as light source arrangement positions are marked with the symbol "☆", and segments which are not defined as light source arrangement positions are marked with the symbol "×".

Similarly to the first pattern, in the third pattern, a left unit 3a, a right unit 3b, and a rear unit 3c are provided. However, conversely to the first pattern, the light source arrangement position in the rear unit 3c is defined in the segment corresponding to the segment at the light source arrangement position in the right unit 3b, in other words, in the leftmost segment in the rear unit 3c. Accordingly, a prism mirror 6a is arranged at a transversely symmetrical position, in the light combining area "S", to the prism mirror 5a in the first pattern, in other words, at a rear right position in the light combining area "S".

Similarly to the second pattern, in the fourth pattern, a left unit 4a, a right unit 4b, and a rear unit 4c are provided. However, conversely to the second pattern, the light source arrangement position in the rear unit 4c is defined in the segment corresponding to the segment at the light source arrangement position in the right unit 4b, in other words, in the rightmost segment in the rear unit 4c. Accordingly, a prism mirror 6b is arranged at a transversely symmetrical position, in the light combining area "S", to the prism mirror 5b in the second pattern, in other words, at a front left position in the light combining area "S".

As shown in FIGS. 6C and 6D, using the third pattern and the fourth pattern as a basic pattern, and arranging the third pattern and the fourth pattern in two rows in the vertical direction, with the third pattern being arranged in the lower row enables to obtain illumination light substantially equivalent to the illumination light in the first arrangement example.

Figure 7B:
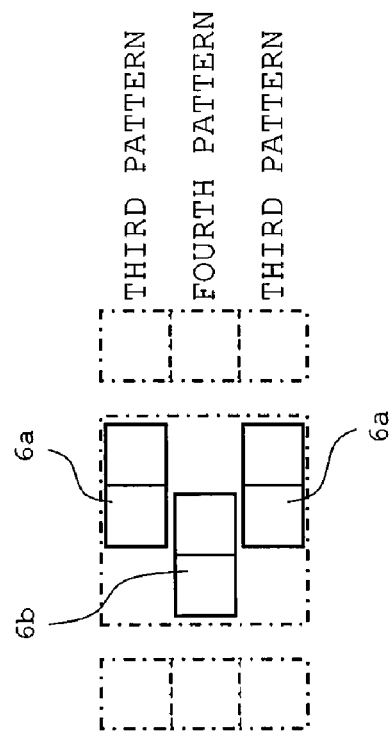
FIGS. 7A and 7B are diagrams for describing a seventh arrangement example of the light combining method.
Figure 7A:
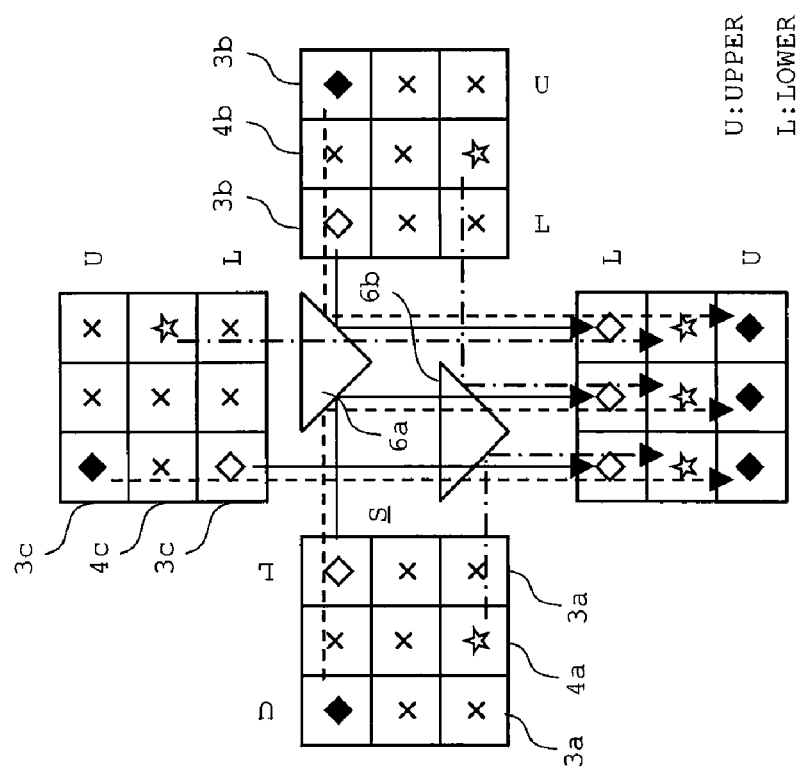

Likewise, as described in the seventh arrangement example as shown in FIGS. 7A and 7B, alternately arranging the third pattern and the fourth pattern in three rows in the vertical direction, with the third pattern being arranged in the lowermost row; or as described in the eighth arrangement example as shown in FIGS. 8A and 8B, alternately arranging the fourth pattern and the third pattern in three rows in the vertical direction, with the fourth pattern being arranged in the lowermost row enables to obtain illumination light substantially equivalent to the illumination light in the second arrangement example.

FIG. 7A is a plan view showing a light combining pattern, wherein the third pattern and the fourth pattern are alternately arranged in three rows in the vertical direction, with the third pattern being arranged in the lowermost row, and FIG. 7B is a front view showing an arrangement of prism mirrors in the light combining pattern shown in FIG. 7A. FIG. 8A is a plan view showing a light combining pattern, wherein the fourth pattern and the third pattern are alternately arranged in three rows in the vertical direction, with the fourth pattern being arranged in the lowermost row, and FIG. 8B is a front view showing an arrangement of prism mirrors in the light combining pattern shown in FIG. 8A.

As described above, various light combining patterns have been described. Alternatively, the number of rows of the first pattern and the second pattern, and the number of rows of the third pattern and the fourth pattern may be changed, as necessary. As far as the first pattern and the second pattern are alternately arranged in multiple rows in the vertical direction, and the third pattern and the fourth pattern are alternately arranged in multiple rows in the vertical direction, light sources are discretely arranged on each of the planes, without a likelihood that each two of the light sources may be arranged in segments adjacent to each other vertically, horizontally, or obliquely, without depending on the number of rows. Further, identical lens array elements can be used with respect to all the three planes.

FIGS. 4A and 4B show an example, wherein the first pattern and the second pattern are alternately arranged in four rows in the vertical direction, and the four-row arrangement is arranged in two columns in the horizontal direction. Alternatively, the multi-row arrangement may be arranged in three or more columns in the horizontal direction. As far as the first pattern and the second pattern are alternately arranged in multiple rows in the vertical direction, and the third pattern and the fourth pattern are alternately arranged in multiple rows in the vertical direction, light sources are discretely arranged on each of the planes, without a likelihood that each two of the light sources may be arranged in segments adjacent to each other vertically or horizontally, without depending on the number of rows or the number of columns. Further, identical lens array elements can be used with respect to all the three planes.

In this way, using the light combining method in accordance with the embodiment is advantageous in arranging the light sources in intended positions, and reducing the cost by using identical lens array elements.

Illumination Device

In this section, construction examples of an illumination device to be realized by the aforementioned light combining method are described. Lens plates (lens plates 41, 42, 43, etc.) in the following construction examples correspond to the lens array elements described in the arrangement examples of the light combining method.

FIGS. 9A, 9B, 9C, and 9D show an arrangement of the first construction example of an illumination device embodying the present invention. FIGS. 9A, 9B, 9C, and 9D are respectively a top plan view, a rear view (diagram viewed from the direction of the arrow P in FIG. 9A), a left side view (diagram viewed from the direction of the arrow Q in FIG. 9A), and a right side view (diagram viewed from the direction of the arrow R in FIG. 9A) of the illumination device.

Figure 9B:
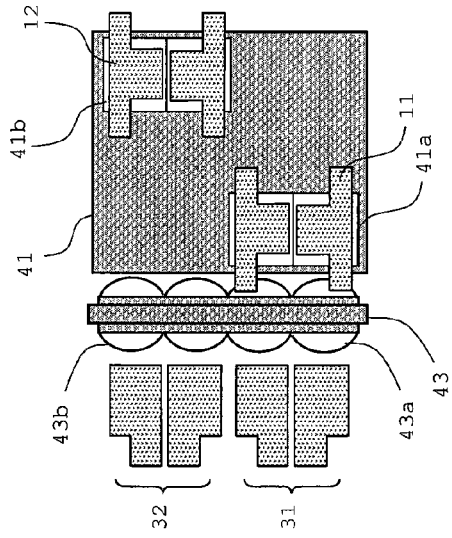
FIGS. 9A, 9B, 9C, and 9D are diagrams showing a first construction example of an illumination device embodying the present invention.

The first construction example of the illumination device is realized by the first arrangement example of the light combining method described referring to FIGS. 1A, 1B, 1C, and 1D. In the illumination device, laser light sources are used as light sources. The laser light sources are arranged at such positions that laser light is emitted from the left plane Pa, the right plane Pb, and the rear plane Pc shown in FIGS. 1A and 1B. In FIG. 9A, for simplifying the description, the left plane Pa, the right plane Pb, and the rear plane Pc shown in FIGS. 1A and 1B are not illustrated. In the following, the left plane Pa, the right plane Pb, and the rear plane Pc are simply called as a left plane, a right plane, and a rear plane, respectively.

The illumination device includes light source modules 11, 12, 21, 22, 31, and 32, and lens plates 41, 42, and 43, and prism mirrors 51 and 52. The two light source modules 11 and 12, and the two light modules 21 and 22 are arranged on the left plane and the right plane, respectively. The two light source modules 31 and 32 are arranged on the rear plane. The lens plates 41, 42, and 43 are arranged on the left plane, the right plane, and the rear plane, respectively. Out of the laser light transmitted through the lens plates 41, 42, and 43, laser light from the light source modules 11 and 21 is reflected in the forward direction by the prism mirror 51, and laser light from the light source modules 12 and 22 is reflected in the forward direction by the prism mirror 52.

Lens portions 41a and 41b respectively corresponding to the light source modules 11 and 12 are integrally formed on the lens plate 41. Likewise, lens portions 42a and 42b respectively corresponding to the light source modules 21 and 22 are integrally formed on the lens plate 42. Likewise, lens portions 43a and 43b respectively corresponding to the light source modules 31 and 32 are integrally formed on the lens plate 43.

FIGS. 10A and 10B show an arrangement of the light source module. FIG. 10A is a front view of the light source module, and FIG. 10B is a left side view of the light source module. As shown in FIGS. 10A and 10B, the light source module includes two light emitting units 100 and 200. The light emitting unit 100 is constituted of a cooling portion 101, a laser light source 102, and an insulating element 300, and the light emitting unit 200 is constituted of a cooling portion 201, a laser light source 202, and the insulating element 300, respectively.

The cooling portion 101, 201 is operable to remove a heat generated in the laser light source 102, 202. In air cooling, a heat sink or a fan is used, and in liquid cooling, a heat is removed by using a liquid cooling jacket, a radiator, or a fan. Alternatively, a Peltier element or a heat pipe may be used as means for transferring a heat in a light source to a heat sink or a radiator, or further alternatively, these elements may be used in combination.

The laser light source 102, 202 is constructed by mounting an edge emitter semiconductor laser element 102b, 202b on a substrate (such as a copper plate) 102a, 202a having a high heat transfer property and conductivity. The laser light source 102, 202 is mounted on the cooling portion 101, 201, with the substrate 102a, 202a being mounted on the cooling portion 101, 201.

As shown in FIGS. 10A and 10B, by mounting the cooling portion 101, 201 on a support member (not shown), the laser light sources 102 and 202 are arranged in such a state that top surfaces thereof are close to each other. The support members each has an actuator for adjusting the position of the light emitting unit 100, 200 in Y-axis direction. Laser light is emitted from the laser light source 102, 202 with an angle whose cross section is elliptical. The direction of the longer axis of elliptical light, and the direction of the shorter axis thereof are respectively aligned in parallel to Y axis and X axis in FIGS. 10A and 10B.

The insulating element 300 is constituted of a sheet-like member with a thickness of e.g. several μm to several hundred μm. In this example, the insulating element 300 is made of a resin material such as a polymer material or a silicone material, or a rubber material. Alternatively, the insulating element 300 may be made of a ceramic material. Providing the insulating element 300 eliminates a likelihood that the upper laser light source and the lower laser light source may be electrically contacted with each other in adjusting the positions of the laser light sources 102 and 202 with respect to the corresponding lens portion of the lens plate, or a like occasion.

Referring back to FIGS. 9A, 9B, 9C, and 9D, the light source modules 11, 12, 21, 22, 31, and 32, and the prism mirrors 51 and 52 are arranged in the illumination device in accordance with the light combining method.

Specifically, the light source modules 11 and 21 face to each other. The prism mirror 51 is arranged on an optical path of laser light from the light source modules 11 and 21. As shown in FIG. 9B, the prism mirror 51 is arranged at a position displaced in the rightward direction with respect to the arrangement position of the light source module 31 and the lens portion 43a, viewed from the rear side of the illumination device.

The light source modules 12 and 22 face to each other. The prism mirror 52 is arranged on an optical path of laser light from the light source modules 12 and 22. As shown in FIG. 9B, the prism mirror 52 is arranged at a position displaced in the leftward direction with respect to the arrangement position of the light source module 32 and the lens portion 43b, viewed from the rear side of the illumination device.

The lens portions 41a and 41b of the lens plate 41, the lens portions 42a and 42b of the lens plate 42, and the lens portions 43a and 43b of the lens plate 43 are constituted of cylindrical lenses to collimate laser light from two light emitting units constituting each of the light source modules 11, 12, 21, 22, 31, and 32 into parallel light in the longer beam axis direction. It should be noted that two cylindrical lenses are necessary for two light emitting units constituting one light source module. In view of this, in this example, one lens portion is constituted of two cylindrical lenses. In this example, solely the cylindrical lenses for collimating laser light into parallel light in the longer beam axis direction are provided. Alternatively, lenses for reducing the angle of laser light in the shorter beam axis direction may be additionally provided.

As shown in FIG. 9A, laser light emitted from the light source module 11, 21 is collimated by the lens portion 41a, 42a into parallel light, the parallel light is then reflected on a corresponding mirror surface of the prism mirror 51, and the reflected light is then guided in the forward direction. Likewise, laser light emitted from the light source module 12, 22 is collimated by the lens portion 41b, 42b into parallel light, the parallel light is then reflected on a corresponding mirror surface of the prism mirror 52, and the reflected light is then guided in the forward direction. Laser light emitted from the laser module 31 is collimated by the lens portion 43a into parallel light, and the parallel light propagates in the forward direction through a space defined on the left side of the prism mirror 51, viewed from the rear side of the illumination device. Likewise, laser light emitted from the laser module 32 is collimated by the lens portion 43b into parallel light, and the parallel light propagates in the forward direction through a space defined on the right side of the prism mirror 52, viewed from the rear side of the illumination device.

In this way, laser light emitted from the six light source modules 11, 12, 21, 22, 31, and 32 is guided in the forward direction of the illumination device, respectively, via the prism mirror 51 or 52, or not via the prism mirrors 51 and 52, whereby the laser light turns into illumination light as a whole.

Figure 9D:
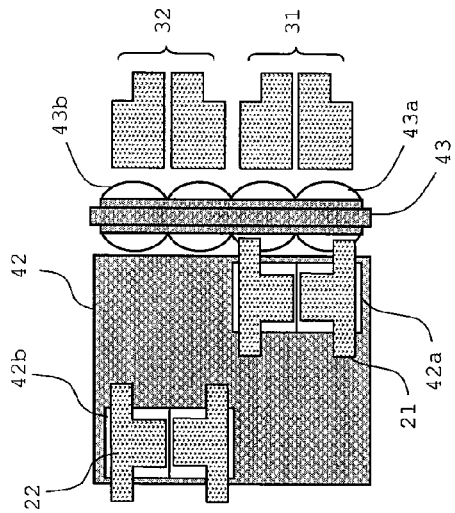
Figure 9A:
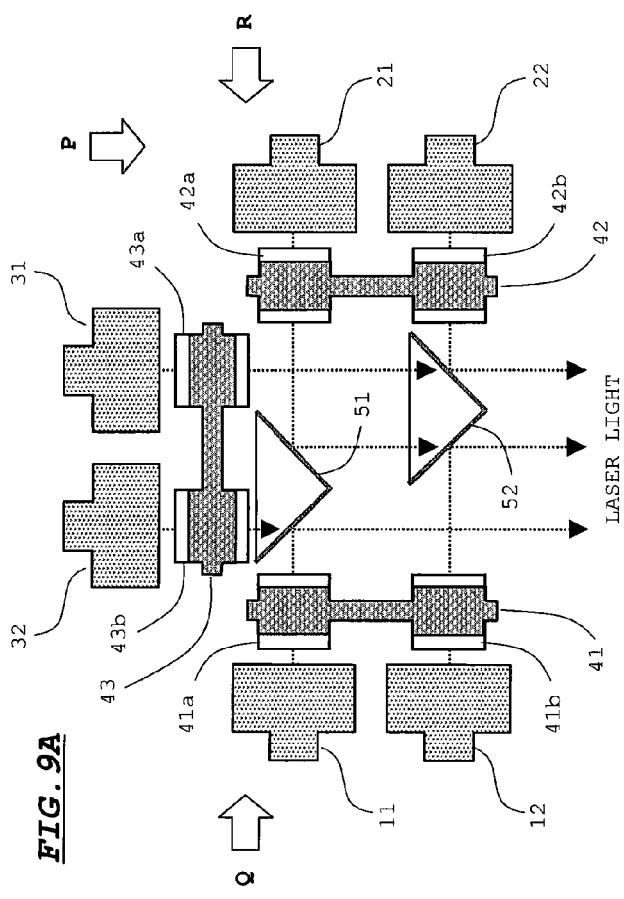
Figure 9C:
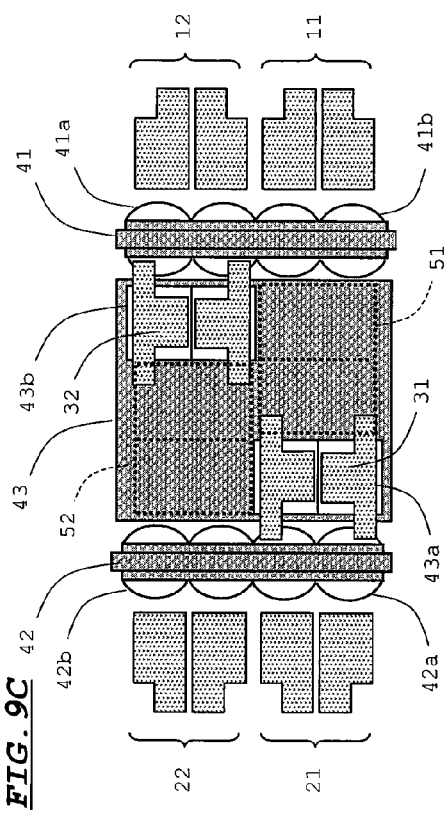

As shown in FIGS. 9B, 9C, and 9D, in the above arrangement, each two of the light source modules are not arranged close to each other on each of the three planes, but are spaced away from each other by a sufficient distance. Accordingly, even if the size of the light source module is increased by mounting a cooling portion on each of the laser light sources, the light source modules are less likely to interfere with each other. Thus, the arrangement enables to arrange the laser light sources in intended positions on each of the planes, while suppressing an increase in the size of the illumination device.

FIG. 11 is a top plane view of the illumination device. In FIG. 11, diagrams of the three lens plates 41, 42, and 43 viewed from the position of the light combining area "S" (position where the light source modules are not provided) are respectively illustrated on left, right and rear sides of the top plane view of the illumination device. As shown in FIG. 11, the arrangement positions of the lens portions 41a and 41b of the lens plate 41 for the left plane, and the arrangement positions of the lens portions 43a and 43b of the lens plate 43 for the rear plane are identical to each other. Accordingly, the lens plate 41 for the left plane can be used as the lens plate 43 for the rear plane. Further, the arrangement positions of the lens portions 41a and 41b of the lens plate 41 for the left plane, and the arrangement positions of the lens portions 42a and 42b of the lens plate 42 for the right plane have a mirror image relation to each other. Accordingly, the lens plate 41 for the left plane can be used as the lens plate 42 for the right plane by horizontally inverting the lens plate 41 for the left plane. In this way, since the identical lens plates can be used with respect to all the planes, the production cost can be reduced.

FIGS. 12A, 12B, 12C, and 12D show an arrangement of the second construction example of the illumination device.

FIGS. 12A, 12B, 12C, and 12D are respectively a top plan view, a rear view (diagram viewed from the direction of the arrow P in FIG. 12A), a left side view (diagram viewed from the direction of the arrow Q in FIG. 12A), and a right side view (diagram viewed from the direction of the arrow R in FIG. 12A) of the illumination device.

The second construction example of the illumination device is realized by the second arrangement example of the light combining method described referring to FIGS. 2A and 2B. The second construction example of the illumination device is different from the first construction example of the illumination device in that three light source modules 13, 23, and 33, and a prism mirror 53 are additionally provided. In other words, the light source modules 13, 23, and 33, and the prism mirror 53 are provided in an upper row with respect to the light source modules 12, 22, and 32, and the prism mirror 52 in the first construction example. Also, lens plates 44, 45, and 46 are provided, in place of the lens plates 41, 42, and 43.

Lens portions 44a, 44b, and 44c corresponding to the light source modules 11, 12, and 13 are integrally formed on the lens plate 44. Likewise, lens portions 45a, 45b, and 45c corresponding to the light source modules 21, 22, and 23 are integrally formed on the lens plate 45. Likewise, lens portions 46a, 46b, and 46c corresponding to the light source modules 31, 32, and 33 are integrally formed on the lens plate 46. These lens portions are each constituted of two cylindrical lenses, as described above.

As shown in FIGS. 12A, 12B, 12C, and 12D, the arrangement relation between the light source modules 13, 23, and 33, and the prism mirror 53 in the uppermost row is identical to the arrangement relation between the light source modules 11, 21, and 31, and the prism mirror 51 in the lowermost row.

In this way, similarly to the first construction example of the illumination device, laser light emitted from the nine light source modules 11, 12, 13, 21, 22, 23, 31, 32, and 33 is guided in the forward direction of the illumination device, respectively, via the prism mirror 51, 52, or 53, or not via the prism mirrors 51, 52, and 53, whereby the laser light turns into illumination light as a whole.

Similarly to the first construction example, in the second construction example of the illumination device, as shown in FIGS. 12B, 12C, and 12D, each three of the light source modules are not arranged close to each other on each of the three planes, but are spaced away from each other by a sufficient distance. Accordingly, even if the size of the light source module is increased by mounting a cooling portion on each of the laser light sources, the light source modules are less likely to interfere with each other. Thus, the arrangement enables to arrange the laser light sources in intended positions on each of the planes, while suppressing an increase in the size of the illumination device.

Figure 13:
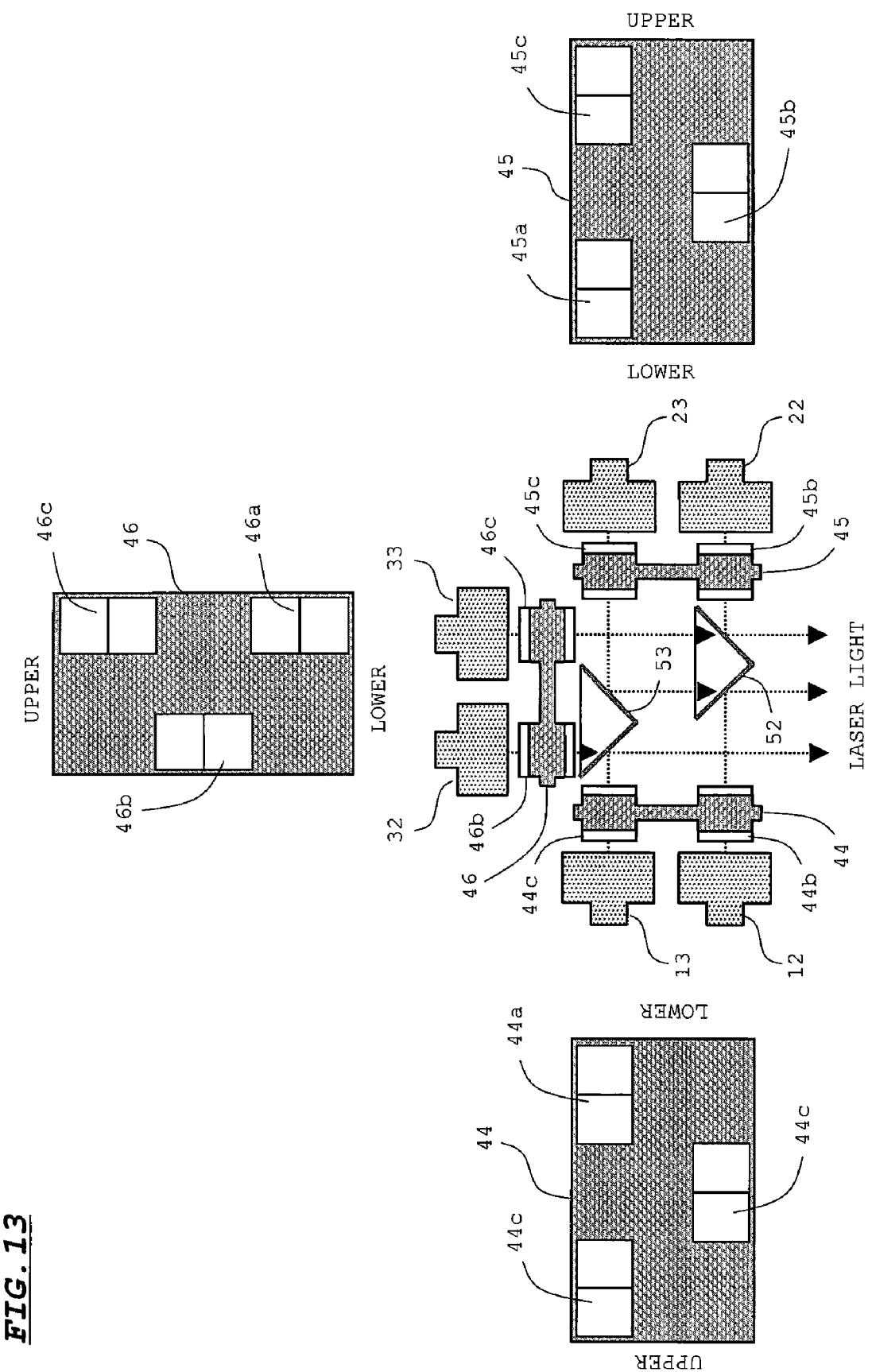
FIG. 13 is a diagram for describing how lens plates in the second construction example of the illumination device are used in common.

FIG. 13 is a diagram corresponding to FIG. 11 showing the first construction example. Similarly to the first construction example, in the second construction example of the illumination device, the lens plate 44 for the left plane can be used as the lens plate 46 for the rear plane. Also, the lens plate 44 for the left plane can be used as the lens plate 45 for the right plane by horizontally inverting the lens plate 44 for the left plane. In this way, since the identical lens plates can be used with respect to all the three planes, the production cost can be reduced.

Figure 14A:
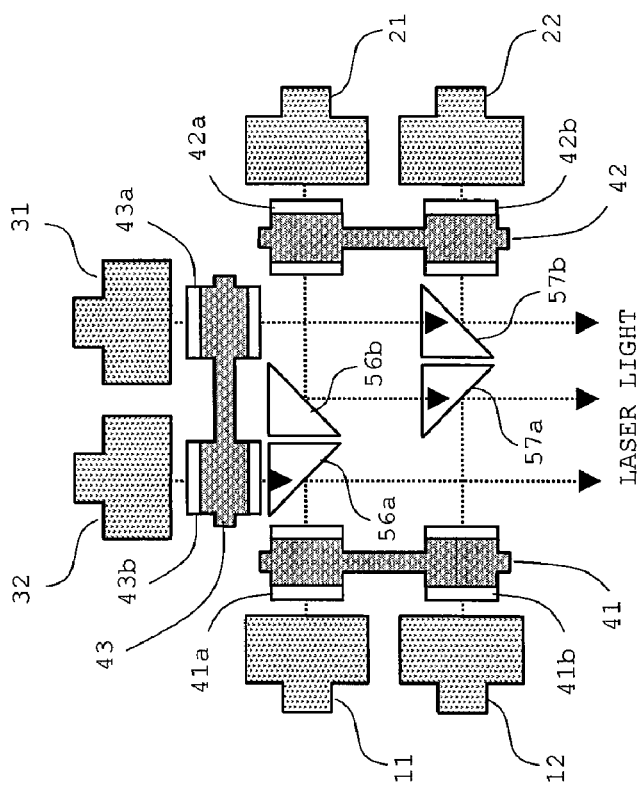
FIGS. 14A and 14B are diagrams showing modification examples of the illumination device.
Figure 14B:
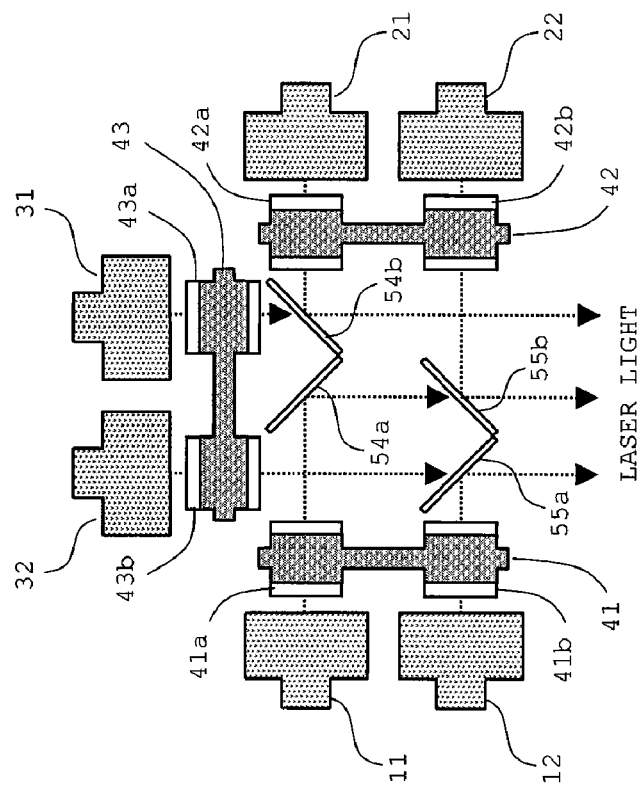

FIGS. 14A and 14B show modification examples of the illumination device. In the first construction example of the illumination device, the prism mirrors 51 and 52 are used as a mirror portion for reflecting light from the light sources. Alternatively, as shown in FIG. 14A, two flat plane mirrors 54a and 54b may be used, in place of the prism mirror 51, and two flat plane mirrors 55a and 55b may be used, in place of the prism mirror 52. Further alternatively, as shown in FIG. 14B, two edge mirrors 56a and 56b may be used, in place of the prism mirror 51, and two edge mirrors 57a and 57b may be used, in place of the prism mirror 52. Use of the prism mirrors 51 and 52, however, is advantageous in reducing the number of parts, and the number of assembling steps.

Figure 15:
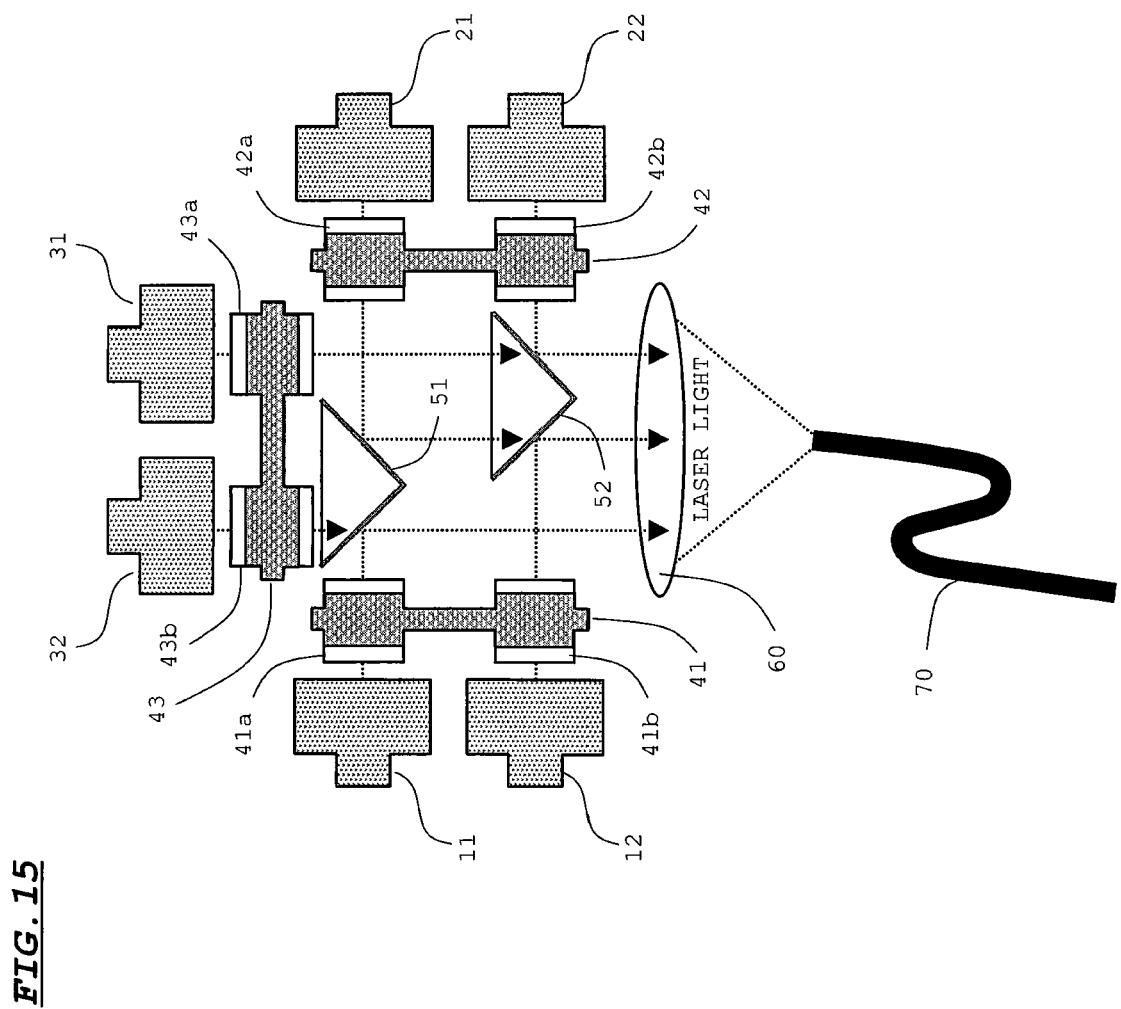
FIG. 15 is a diagram showing an arrangement of a further modification example of the illumination device.

FIG. 15 shows a further modification example of the illumination device. The illumination device shown in FIG. 15 is constructed in such a manner that illumination light combined by the prism mirrors 51 and 52 is condensed by a condensing lens 60, and the condensed light is coupled through an optical fiber 70.

Normally, in the case where light is integrated by coupling light from light sources through an optical fiber to obtain small-sized illumination light, an optical fiber and a condensing lens (optical system) are prepared with respect to each of the light sources. Then, exit ends of the optical fibers are bundled, and light from the light sources is incident into incident ends of the optical fibers through the corresponding condensing lenses.

In the arrangement of the modification example, since illumination light combined and integrated by the prism mirrors 51 and 52 is utilized, the illumination light can be condensed by a single condensing lens, and coupled through a single optical fiber. This arrangement enables to reduce the number of parts such as the optical fibers and the condensing lenses.

A clad is formed around a core of an optical fiber through which light is actually passed. In the case where multiple optical fibers are bundled, an interval corresponding to the thickness of clad is defined between the adjacent cores. As a result, the size of illumination light to be emitted from the entirety of the bundled optical fibers cannot be effectively reduced. Unlike the above arrangement, in the arrangement of the modification example, since a single optical fiber having a sufficiently large core can be used, the size of illumination light can be effectively reduced, without considering an influence of the clad.

In the arrangement example of the light combining method, as shown in FIG. 16A, one light source is arranged in one segment defined as a light source arrangement position on each of the planes. Alternatively, one light emitting portion may be arranged in one segment. Further alternatively, two or more light emitting portions may constitute one light source, and the light source may be arranged in one segment defined as a light source arrangement position.

For instance, in a construction example of the illumination device, as shown in FIG. 16B, two light emitting portions (laser light sources) are arranged in a segment corresponding to a light source arrangement position. More specifically, as shown in FIG. 16C, two light emitting portions each mounted with a cooling portion are arranged in such a state that top surfaces of the two light emitting portions are close to each other so that the cooling portions may not interfere with each other. In other words, in this construction example, one light source is constructed by combining two light emitting portions, and the light source is arranged in a segment corresponding to a light source arrangement position.

As described above, the light source to be used in the present invention is not necessarily constituted of one light emitting portion, but may be constituted of multiple light emitting portions. In the case where multiple light emitting portions are combined, it is necessary not to interfere cooling portions with each other, considering the object of the present invention. As far as the above requirement is satisfied, one light source may be constructed by combining multiple light emitting portions. In other words, in the case where multiple light emitting portions are combined, as shown in FIG. 16D, for instance, a light source module may be constructed by mounting two light emitting portions on one cooling portion, or a light source module may be constructed by mounting three or more light emitting portions on one cooling portion, in place of the arrangement as shown in FIG. 16C, wherein two light emitting portions are arranged in a state that top surfaces thereof are close to each other.

In summary, considering the object of the present invention that interference between cooling portions is avoided, the light source to be used in the present invention may be constituted of multiple light emitting portions constructed in such a manner that cooling portions do not interfere with each other.

In the case where one light source is constituted of multiple light emitting portions, the colors of laser light to be emitted from the light emitting portions may be made different from each other, in place of an arrangement that the colors of laser light to be emitted from the light emitting portions constituting one light source are made identical to each other For instance, in the first construction example of the illumination device, light emitting portions of red (R), green (G), and blue (B) may be arranged, as shown in FIG. 16E. In the second construction example of the illumination device, light emitting portions of red (R), green (G), and blue (B) may be arranged in such a manner that the colors are different with respect to each of the light sources (light source modules), as shown in FIG. 16F.

It is necessary to adjust the characteristics of the lens portions with respect to each of the colors, considering color aberration. In adjusting the characteristics of the lens portions, identical lens plates can be used by making the colors of the light emitting portions at the identical light source arrangement positions between two planes (the left plane and the rear plane in the first and the second construction examples) identical to each other, and making the colors of the light emitting portions having a mirror image relation in the light source arrangement position between two planes (the left plane and the right plane in the first and the second construction examples) identical to each other. In other words, controlling the colors of the light emitting portions as described above enables to adjust the curvatures or the like of the lens portions depending on the colors, even in the case where lens plates of a single kind are used.

Projection Display Device

Figure 17:
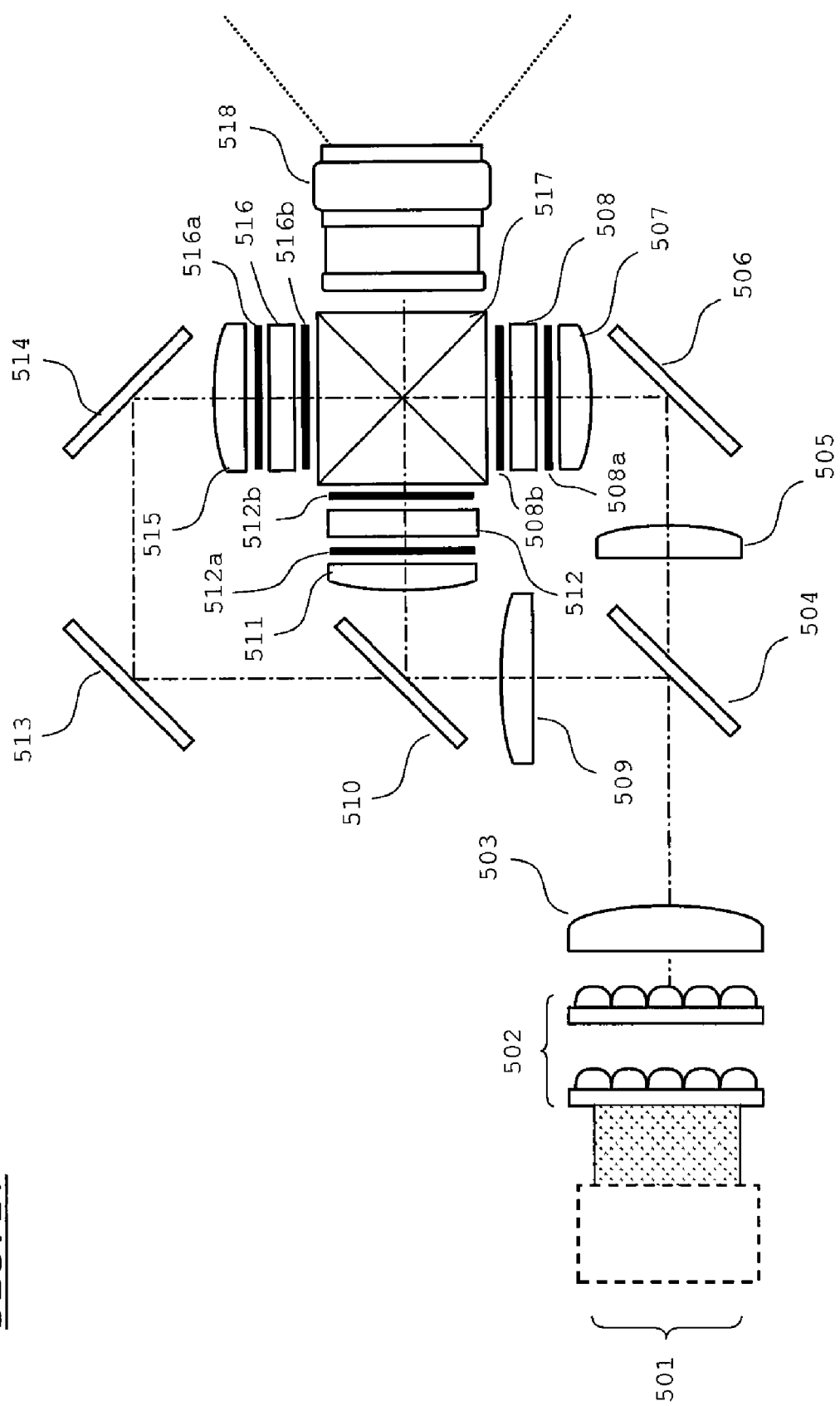
FIG. 17 is a diagram showing an optical system of a projector loaded with the illumination device.

FIG. 17 shows an optical system of a projector loaded with the illumination device embodying the present invention. In FIG. 17, the reference numeral 501 indicates the illumination device embodying the present invention. For instance, the first construction example or the second construction example of the illumination device may be used as the illumination device 501.

In the case where the illumination device 501 has the arrangement of the first construction example, for instance, as described above referring to FIG. 16E, laser light of combination of red, green, and blue is emitted from the illumination device 501 by making the colors of laser light to be emitted from two light emitting portions constituting each of the light source modules different from each other. In the case where the illumination device 501 has the arrangement of the second construction example, for instance, as described above referring to FIG. 16F, laser light of combination of red, green, and blue is emitted from the illumination device 501 by making the colors of laser light different from each other with respect to each of the light source modules.

The light from the illumination device 501 is incident into a condenser lens 503 through a fly-eye lens 502. The fly-eye lens 502 is constituted of fly-eye lens cells, and is operable to superimpose light to be incident from the illumination device 501 in such a manner that the light amount distributions of light to be incident onto liquid crystal panels 508, 512, and 516 are made equal to each other.

Light condensed by the condenser lens 503 is incident onto a dichroic mirror 504. The dichroic mirror 504 is operable to transmit solely light (hereinafter, called as "R light") in a red wavelength band, and reflect light (hereinafter, called as "B light") in a blue wavelength band, and light (hereinafter, called as "G light") in a green wavelength band, out of the light incident from the condenser lens 503.

The R light transmitted through the dichroic mirror 504 is guided to the liquid crystal panel 508 through two lenses 505 and 507, and a mirror 506, and is incident onto the liquid crystal panel 508 through an incident-side polarizer 508a. The liquid crystal panel 508 is driven in accordance with an image signal for red color, and is operable to modulate the R light depending on the driven state. The R light modulated by the liquid crystal panel 508 is incident onto a dichroic prism 517 through an output-side polarizer 508b.

The B light and the G light reflected by the dichroic mirror 504 is incident onto a dichroic mirror 510 through a lens 509. Out of the B light and the G light, the G light is reflected by the dichroic mirror 510 for incidence onto a lens 511. Thereafter, the G light is incident onto the liquid crystal panel 512 through an incident-side polarizer 512a. The liquid crystal panel 512 is driven in accordance with an image signal for green color, and is operable to modulate the G light depending on the driven state. The G light modulated by the liquid crystal panel 512 is incident onto the dichroic prism 517 through an output-side polarizer 512b.

The B light transmitted through the dichroic mirror 510 is incident onto a lens 515 through two mirrors 513 and 514. Thereafter, the B light is incident onto the liquid crystal panel 516 through an incident-side polarizer 516a. The liquid crystal panel 516 is driven in accordance with an image signal for blue color, and is operable to modulate the B light depending on the driven state. The B light modulated by the liquid crystal panel 516 is incident onto the dichroic prism 517 through an output-side polarizer 516b.

The dichroic mirror 517 is operable to combine the R light, the G light, and the B light modulated by the liquid crystal panels 508, 512, and 516, respectively, for incidence onto a projection lens 518. The projection lens 518 includes lenses for forming projected light onto a projection plane as a projected image, and an actuator for controlling a zoom state and a focus state of the projected image by displacing a part of the lenses in the optical axis direction. The color image light subjected to color combination by the dichroic prism 517 is enlarged and projected on a screen by the projection lens 518.

The embodiment of the present invention has been described as above, but the present invention is not limited to the foregoing embodiment. The embodiment of the present invention may be changed or modified in various ways, as necessary, other than the above.

For instance, in the embodiment, laser light from a light emitting unit is collimated into parallel light by a cylindrical lens. Alternatively, laser light may be collimated into parallel light by at least one of a condensing lens, a cylindrical refractive index distribution lens, a diffraction element or a like element, or combination thereof, in place of a cylindrical lens.

In the embodiment, a projector constructed to guide light from an illumination device to liquid crystal panels by using dichroic mirrors and mirrors has been described. In the case where light from an illumination device is guided using an optical fiber, as described in the example referring to FIG. 15, it is desirable to construct a projector by using a digital micromirror device as an imager, in place of a liquid crystal imager utilizing a polarized direction, because the polarized direction of light is changed.

In the embodiment, there has been described an example, wherein the inventive illumination device is loaded in a projector. Alternatively, the inventive illumination device may be loaded in other device such as a light exposure device or an illuminating/processing device.

The embodiment of the present invention may be changed or modified in various ways other than the above, as far as such changes and modifications do not depart from the scope of the present invention hereinafter defined.

What is claimed is:

1. A light combining method for combining light to be emitted from a first plane, a second plane opposing to the first plane, and a third plane connecting the first plane and the second plane in a transverse direction by a mirror portion, comprising:

arranging a first unit constituted of three segments in a horizontal direction and one segment in a vertical direction, and a second unit having the same arrangement as the first unit on the first plane and the second plane, respectively, in such a manner that the segments in the first unit and the segments in the second unit oppose to each other, and arranging a third unit having the same arrangement as the first unit on the third plane on the same level as the first unit and the second unit to define a first light source arrangement pattern and a second light source arrangement pattern;

defining the first light source arrangement pattern by: defining segments opposing to each other and arranged at end positions out of the three segments in the first unit and the three segments in the second unit, as light source arrangement positions; and defining one of the three segments in the third unit, at the same position as the segment defined as the light source arrangement position in the first unit, as a light source arrangement position;

defining the second light source pattern by: defining segments out of the segments in the first unit, the second unit, and the third unit, at end positions opposite to the segments defined as the light source arrangement positions in the first light source arrangement pattern, as light source arrangement positions;

alternately arranging the first light source arrangement pattern and the second light source arrangement pattern in the vertical direction; and arranging the mirror portion for reflecting light from light sources arranged at the light source arrangement positions on the first plane and the second plane in the same direction as light from light sources arranged at the light source arrangement positions on the third plane to combine the light from the light sources, in an area surrounded by the first plane, the second plane, and the third plane.

2. The light combining method according to claim 1, wherein a group of the first units on the first plane, a group of the second units on the second plane, and a group of the third units on the third plane to be constructed by alternately arranging the first light source arrangement pattern and the second light source arrangement pattern in the vertical direction are arranged in the horizontal direction by the number "n" (n is an integer of 2 or more) on the first plane, the second plane, and the third plane, respectively, to define the light source arrangement positions on the first plane, the second plane, and the third plane, and the mirror portion for reflecting the light from the light sources arranged at the light source arrangement positions on the first plane and the second plane in the same direction as the light from the light sources arranged at the light source arrangement positions on the third plane to combine the light from the light sources is arranged in the area surrounded by the first plane, the second plane, and the third plane.

3. An illumination device for combining light to be emitted from a first plane, a second plane opposing to the first plane, and a third plane connecting the first plane and the second plane in a transverse direction to generate illumination light, comprising:

a first light source unit arranged at such a position as to emit the light from the first plane;

a second light source unit arranged at such a position as to emit the light from the second plane;

a third light source unit arranged at such a position as to emit the light from the third plane; and a mirror unit for reflecting the light from the first light source unit and the light from the second light source unit in the same direction as the light from the third light source unit, wherein a first unit constituted of three segments in a horizontal direction and one segment in a vertical direction, and a second unit having the same arrangement as the first unit are arranged on the first plane and the second plane, respectively, in such a manner that the segments in the first unit and the segments in the second unit oppose to each other, and a third unit having the same arrangement as the first unit is arranged on the third plane on the same level as the first unit and the second unit to define a first light source arrangement pattern and a second light source arrangement pattern, the first light source arrangement pattern is defined by: defining segments opposing to each other and arranged at end positions out of the three segments in the first unit and the three segments in the second unit, as light source arrangement positions; and defining one of the three segments in the third unit, at the same position as the segment defined as the light source arrangement position in the first unit, as a light source arrangement position, the second light source pattern is defined by: defining segments out of the segments in the first unit, the second unit, and the third unit, at end positions opposite to the segments defined as the light source arrangement positions in the first light source arrangement pattern, as light source arrangement positions, the first light source unit, the second light source unit, and the third light source unit are constructed by arranging light sources at the light source arrangement positions defined by alternately arranging the first light source arrangement pattern and the second light source arrangement pattern in the vertical direction, and the mirror unit is constructed by arranging mirrors constituting the mirror unit at such positions that the light from the light sources arranged at the light source arrangement positions on the first plane and the second plane is reflected in the same direction as the light from the light sources arranged at the light source arrangement positions on the third plane to combine the light from the light sources.

4. The illumination device according to claim 3, wherein a group of the first units on the first plane, a group of the second units on the second plane, and a group of the third units on the third plane to be constructed by alternately arranging the first light source arrangement pattern and the second light source arrangement pattern in the vertical direction are arranged in the horizontal direction by the number "n" (n is an integer of 2 or more) on the first plane, the second plane, and the third plane, respectively, to define the light source arrangement positions on the first plane, the second plane, and the third plane, the light sources are arranged at the light source arrangement positions, and the mirrors constituting the mirror unit are arranged at such positions that the light from the light sources arranged at the light source arrangement positions on the first plane and the second plane is reflected in the same direction as the light from the light sources arranged at the light source arrangement positions on the third plane to combine the light from the light sources.

5. The illumination device according to claim 3, further comprising:

lenses arranged at emission positions of the light sources in the first light source unit, the second light source unit, and the third light source unit, respectively, the lenses being integrally formed with respect to each of the first light source unit, the second light source unit, and the third light source unit.

6. A projection display device, comprising:

an illumination device for combining light to be emitted from a first plane, a second plane opposing to the first plane, and a third plane connecting the first plane and the second plane in a transverse direction to generate illumination light;

a modulating portion for modulating the illumination light to be emitted from the illumination device; and a projecting portion for projecting the light modulated by the modulating portion onto a projection plane, wherein the illumination device includes:

a first light source unit arranged at such a position as to emit the light from the first plane;

a second light source unit arranged at such a position as to emit the light from the second plane;

a third light source unit arranged at such a position as to emit the light from the third plane; and a mirror unit for reflecting the light from the first light source unit and the light from the second light source unit in the same direction as the light from the third light source unit, wherein a first unit constituted of three segments in a horizontal direction and one segment in a vertical direction, and a second unit having the same arrangement as the first unit are arranged on the first plane and the second plane, respectively, in such a manner that the segments in the first unit and the segments in the second unit oppose to each other, and a third unit having the same arrangement as the first unit is arranged on the third plane on the same level as the first unit and the second unit to define a first light source arrangement pattern and a second light source arrangement pattern, the first light source arrangement pattern is defined by: defining segments opposing to each other and arranged at end positions out of the three segments in the first unit and the three segments in the second unit, as light source arrangement positions; and by defining one of the three segments in the third unit, at the same position as the segment defined as the light source arrangement position in the first unit, as a light source arrangement position, the second light source pattern is defined by: defining segments out of the segments in the first unit, the second unit, and the third unit, at end positions opposite to the segments defined as the light source arrangement positions in the first light source arrangement pattern, as light source arrangement positions, the first light source unit, the second light source unit, and the third light source unit are constructed by arranging light sources at the light source arrangement positions defined by alternately arranging the first light source arrangement pattern and the second light source arrangement pattern in the vertical direction, and the mirror unit is constructed by arranging mirrors constituting the mirror unit at such positions that the light from the light sources arranged at the light source arrangement positions on the first plane and the second plane is reflected in the same direction as the light from the light sources arranged at the light source arrangement positions on the third plane to combine the light from the light sources.

* * * * *